(12) United States Patent
Jackson et al.

(10) Patent No.: US 6,886,017 B1
(45) Date of Patent: Apr. 26, 2005

(54) SYSTEM AND METHOD FOR MANAGING DISTRIBUTION OF CONTENT TO A DEVICE

(75) Inventors: Bruce Jackson, Dorset (GB); Nigel Robert Brookes, Salisbury (GB)

(73) Assignee: elata Limited, Dorset (GB)

( * ) Notice: Subject to any disclaimer, the term of this patent is extended or adjusted under 35 U.S.C. 154(b) by 643 days.

(21) Appl. No.: 09/460,450

(22) Filed: Dec. 13, 1999

(30) Foreign Application Priority Data

| Apr. 30, 1999 | (GB) | 9910164 |
| Sep. 21, 1999 | (GB) | 9922348 |
| Oct. 6, 1999 | (GB) | 9923640 |

(51) Int. Cl.$^7$ .......................................... G06F 17/30
(52) U.S. Cl. ................ 707/104; 707/1; 707/10; 707/6; 707/102; 710/8
(58) Field of Search ................ 707/1, 10, 201, 707/6, 102, 104; 709/206; 705/26; 710/8; 715/500

(56) References Cited

U.S. PATENT DOCUMENTS

| 5,581,764 A | | 12/1996 | Fitzgerald et al. | |
| 5,692,129 A | | 11/1997 | Sonderegger et al. | |
| 5,742,820 A | * | 4/1998 | Perlman et al. | 707/201 |
| 5,797,128 A | | 8/1998 | Birnbaum | |
| 5,828,876 A | * | 10/1998 | Fish et al. | 707/1 |
| 5,845,077 A | | 12/1998 | Fawcett | |
| 5,859,978 A | | 1/1999 | Sonderegger et al. | |
| 5,875,327 A | | 2/1999 | Brandt et al. | |
| 5,884,280 A | * | 3/1999 | Yoshioka et al. | 705/26 |
| 5,946,689 A | * | 8/1999 | Yanaka et al. | 707/10 |
| 5,961,590 A | * | 10/1999 | Mendez et al. | 709/206 |
| 6,018,762 A | * | 1/2000 | Brunson et al. | 709/206 |
| 6,553,431 B1 | * | 4/2003 | Yamamoto et al. | 710/8 |
| 2003/0074632 A1 | * | 4/2003 | Marks et al. | 715/500 |

FOREIGN PATENT DOCUMENTS

| EP | 0 793 170 A1 | 9/1997 |
| GB | 2 341 956 | 3/2000 |
| WO | 91/08542 | 6/1991 |
| WO | 94/25913 | 11/1994 |
| WO | 97/03399 | 1/1997 |

OTHER PUBLICATIONS

"Tivoli Enterprise Concepts, Architecture, and Services", pp. 1–30.
http://www.ct.hughsym.co.uk/media/whitepapers/acacia.pdf, "Acacia White Paper", Aug. 12, 1999.
Computer record Accession No. 02168408, "Directory Services, Not Ncs, Will Cut TCO", J. Lewis, PC Week v15, n10, p104, Mar. 9, 1998.

* cited by examiner

*Primary Examiner*—Thuy N. Pardo
(74) *Attorney, Agent, or Firm*—Renner, Otto, Boisselle & Sklar, LLP

(57) ABSTRACT

The present invention provides a system and method for managing distribution of content to a device, the system comprising a database for storing a number of elements as a hierarchical structure, content identifiers being able to be associated with elements in the hierarchical structure, and one of the elements representing the device, and a server for referencing the hierarchical structure in the database to generate a profile for the device, the profile containing a number of content identifiers indicating content to be provided to the device. A device manager is associated with the device and arranged to receive the profile from the server and to use the content identifiers in the profile to cause the content indicated by the profile to be provided to the device, a record being kept identifying the content provided to the device in accordance with the profile. The device manager is arranged upon receipt of a subsequent profile from the server to compare the content identifiers in the subsequent profile with the record to determine new content not yet provided on the device and old content no longer to be provided on the device, the device manager being arranged to use the relevant content identifiers to cause the new content to be provided to the device, and to cause the old content to be removed. This approach facilitates the efficient management of distribution of content to devices.

24 Claims, 18 Drawing Sheets

Fig.6

Full Name
• Nigel Brookes

Type
• person

Organisation
• H S G

Organisational Unit
• Concept Technologies

Email

Concept Technologies
Engineer — Nigel Brookes
       — Hugh
       — Cuthbert
       — Bruce Jackson
Sales
Maintenance
Support

| Programs | Types | | | |
|---|---|---|---|---|
| Name | Version | Type | Last Modified | URL |
| Blue | 7 | Plugin | 26-Apr-99 | ftp://luggage/pub/Blue |
| Green | 1 | OS | 26-Apr-99 | http://luggage:8 08 0/Green |
| Indigo | 1 | Application | 26-Apr-99 | http://luggage:8 08 0/Ind... |
| Orange | 1.0 | Plugin | 26-Apr-99 | rmi://luggage/Orange |
| Red | 1.0 alpha | Application | 26-Apr-99 | rmi://luggage/Red |

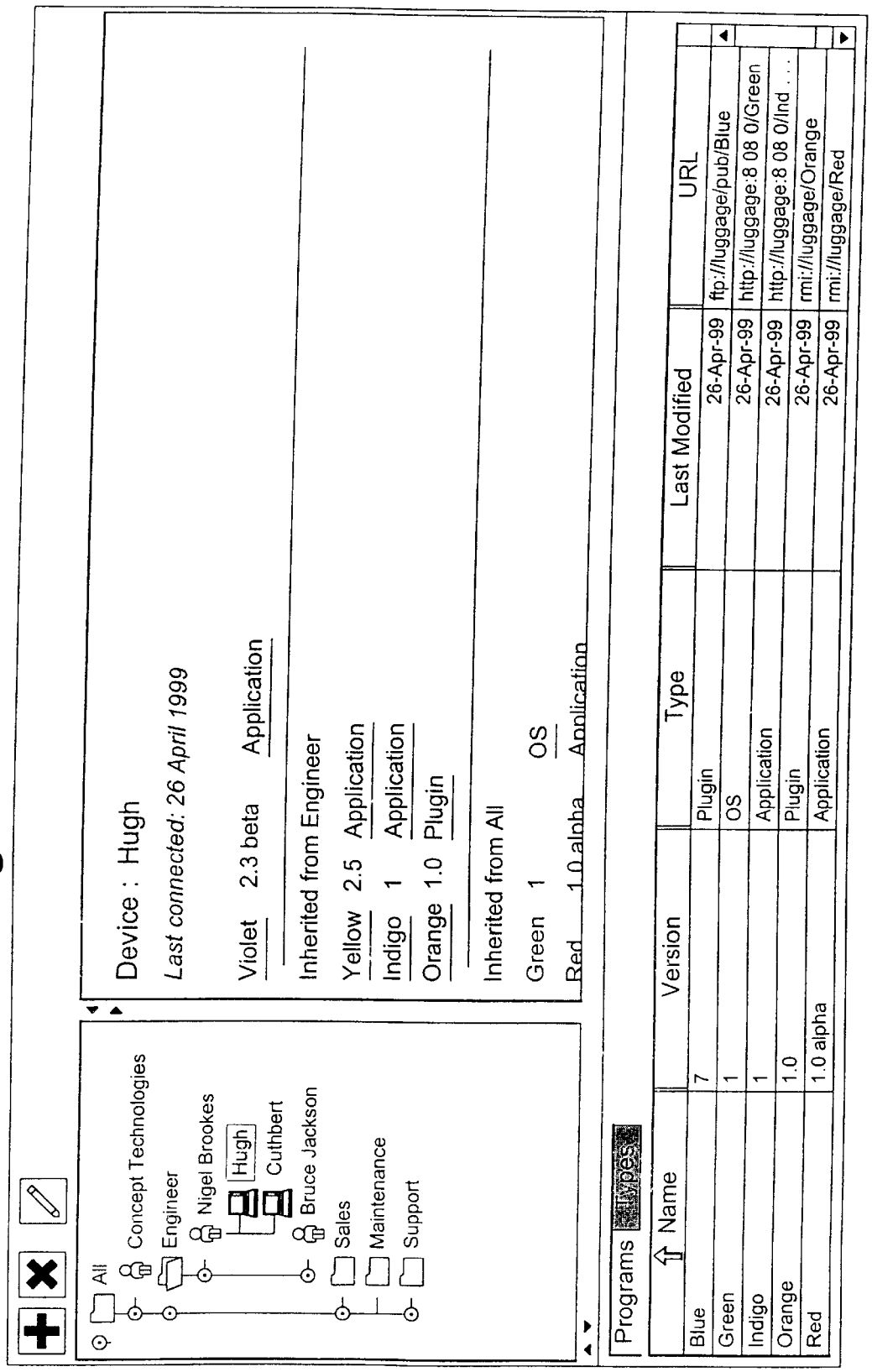

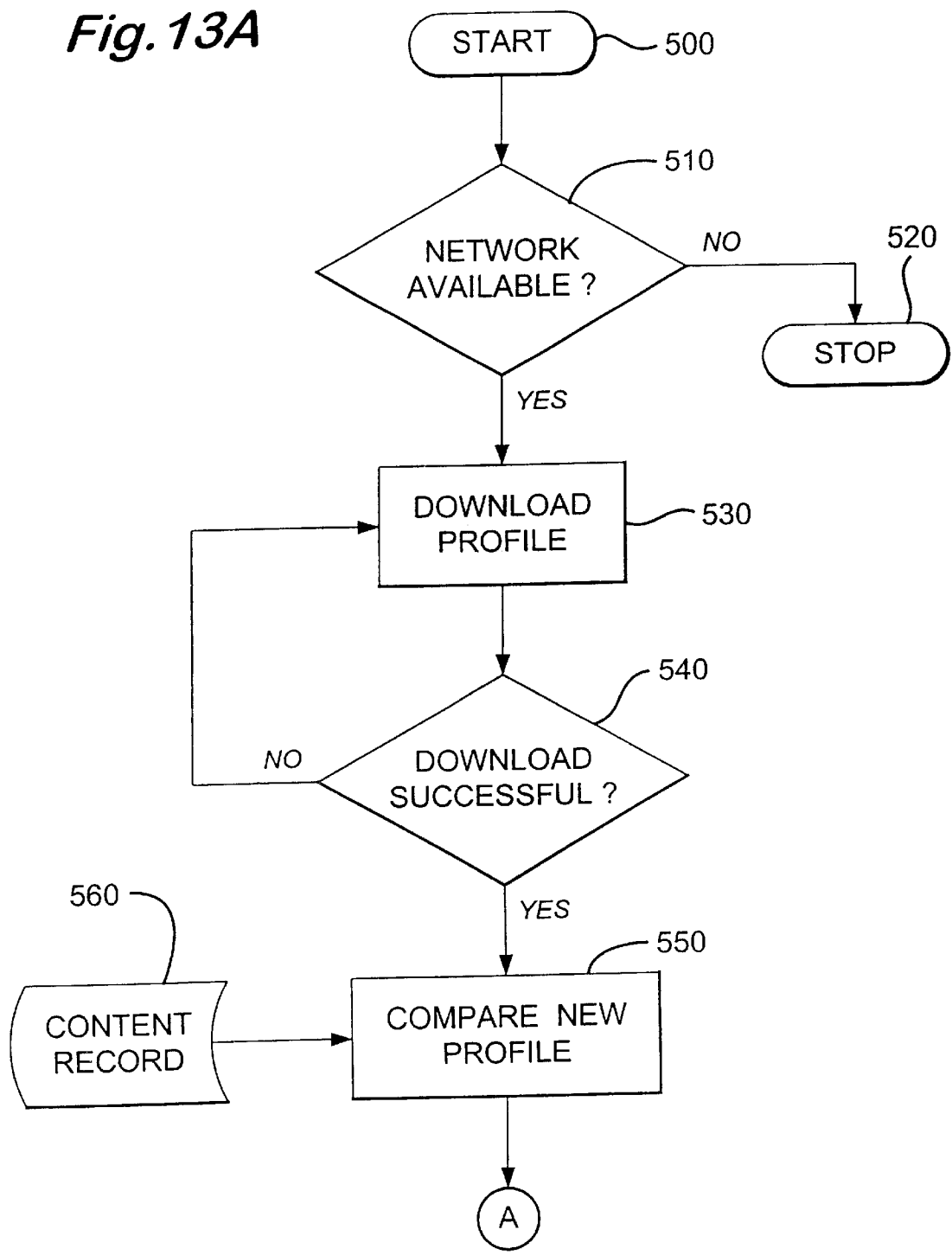

SYSTEM AND METHOD FOR MANAGING DISTRIBUTION OF CONTENT TO A DEVICE

BACKGROUND OF THE INVENTION

1. Field of the Invention

The present invention relates to a system and method for managing distribution of content to a device.

2. Description of the Prior Art

Content to be provided to a device may take a variety of different forms. For example, data files may be provided to the device for use with particular applications installed upon the device. Further, particular application programs may be distributed to the device for installation on the device in order to facilitate new functions, for example word processing programs, spreadsheet programs, e-mail programs, etc.

Up until now, much of the development of techniques for managing the distribution of content to devices has centered on the area of fixed computer devices connected to a computer network. Within such an environment, it is then possible to provide a localised management support structure to provide content on the network, and to control individual devices' access to that content.

For example, U.S. Pat. No. 5,692,129 describes a technique for managing application programs in a computer network. When a computer networks is provided within an organisation, it is commonplace for a directory services database to be provided on the computer network to provide a "White Pages" style directory concerning people and other resources within the organisation. Often such directory service databases are object oriented databases. In accordance with the teaching of U.S. Pat. No. 5,692,129, such an object oriented database is adapted to support the inclusion of application objects defining software applications available on the network. Further, certain types of objects in the database, such as user objects, are adapted to allow desktop attributes to be specified. An application object can then be added as a desktop attribute for such an object, to indicate that the corresponding application should be made available to the user represented by the object.

Additionally, U.S. Pat. No. 5,692,129 specifies the use of a launcher application, which for a particular user can be arranged to retrieve that user's object, and to adapt the user's desktop to provide icons for any application specified by application objects identified in the user object's desktop attributes. Hence, by the above approach, a user's desktop can be automatically updated to indicate those applications that are installed on the network and are available to that user for accessing. The applications themselves are retained centrally on the network, and the user accesses them over the network.

Whilst this technique is clearly beneficial to computer devices that are permanently connected to the network, and hence able to run applications on the network, it is clearly not suitable for distributed devices that may only make periodic connections to a network, and when not connected to a network will still need to be self-contained (i.e. will need the content to be stored locally for their own use). However, such a scenario is becoming more and more commonplace, with the proliferation in portable computer devices, mobile phones, personal digital assistant devices (PDA), electronic organisers, etc. Whilst it is clearly desirable for an organisation to allow individuals within the organisation to use such portable devices, it makes it significantly more difficult to control and manage the distribution of content to those devices.

SUMMARY OF THE INVENTION

Viewed from a first aspect, the present invention provides a system for managing distribution of content to a device, comprising: a database for storing a number of elements as a hierarchical structure, content identifiers being able to be associated with elements in the hierarchical structure, and one of the elements representing the device; a server for referencing the hierarchical structure in the database to generate a profile for the device, the profile containing a number of content identifiers indicating content to be provided to the device; a device manager associated with the device and arranged to receive the profile from the server and to use the content identifiers in the profile to cause the content indicated by the profile to be provided to the device, a record being kept identifying the content provided to the device in accordance with the profile; the device manager further being arranged upon receipt of a subsequent profile from the server to compare the content identifiers in the subsequent profile with the record to determine new content not yet provided on the device and old content no longer to be provided on the device, the device manager being arranged to use the relevant content identifiers to cause the new content to be provided to the device, and to cause the old content to be removed.

In accordance with the present invention, a database is provided that enables a number of elements to be stored as a hierarchical structure, with at least one of the elements representing a device to which content is to be distributed. Content identifiers identifying particular content may then be associated with elements in the hierarchical structure. Further, a server is provided which is able to reference the hierarchical structure in the database in order to generate a profile for a particular device, the profile containing a number of content identifiers, each content identifier identifying a content to be provided to that device. A device manager associated with the device is then able to act upon receipt of the profile to cause the content indicated by the profile to be provided to the device, with a record being kept identifying the content provided to the device in accordance with the profile. The record is preferably stored in a logically local storage area relative to the device, i.e. in a location that the device is always able to read irrespective of whether it is connected to a network.

The device manager may be stored on the device, or may be remote from the device. However, in the latter case, there will typically be something resident on the device itself to cause the device manager to execute, for example some configuration information.

In accordance with the present invention, when at some later point the device manager receives a subsequent profile from the server, it is arranged to compare the content identifiers in that subsequent profile with the record kept to identify the content provided to the device in accordance with a previous profile in order to determine new content not yet provided on the device and old content no longer to be provided on the device. The new content can then be retrieved to the device, whilst the old content is removed, for example by actually deleting that content, or by removing pointers to it in the local memory of the device.

By this approach, the system of the present invention is able to support a wide variety of different devices that may spend greater or lesser amounts of time connected to a network and which may need to store content locally in order to facilitate its use whilst not connected to the network. It should also be noted that the system also supports use with devices that may be permanently connected to the network.

Through use of the present invention, the content provided to a device can be centrally managed such that once a content identifier has been associated with the appropriate element in the hierarchical structure, then that content identifier will be included in any profiles subsequently prepared for relevant devices, whereby the corresponding device manager for such a device will cause that content to be provided to the device the next time the profile is received. However, given that the content is not merely maintained centrally and accessed at that central point by the devices, but instead will typically be provided to the devices, the present invention further facilitates the removal of old content from a device through the comparison of a subsequent profile distributed by the server with a record kept to identify the content on that device that has been provided in accordance with a previous profile.

It should be noted that in preferred embodiments the present invention does not inhibit a user of a device from also installing their own content on the device since such content would not be included in the profiles, and so would not be provided to the device, or removed from the device, under the control of the device manager. However, the present invention does enable the distribution of certain core content to devices to be managed such that that content may be provided and subsequently removed in a structured manner without the need to involve the user of the device.

The content identifier may take a variety of forms. However, in preferred embodiments, each content identifier provides a name for the corresponding content, and a location indicator identifying a location from which that content can be obtained. Hence, when the device manager is seeking to obtain a content for the device, the location indicator in the corresponding content identifier can be used to determine the location from which the content can be obtained. In preferred embodiments, the name is not needed for the content retrieval process, but provides a descriptive reference for a network manager responsible for managing the hierarchical structure on the database, and indeed for the user of the device to which the content is retrieved.

The system in accordance with preferred embodiments of the present invention may be used to manage the distribution of a plurality of different types of content. Hence, preferably, the content identifier further identifies the type of the corresponding content. This information is then available for reference by a network manager responsible for managing the hierarchical structure on the database. This may, for example, provide a useful sanity check to enable the network manager to ensure that content is only allocated to devices able to receive that type of content.

It will be appreciated that the location identifier can take a variety of forms, provided that it serves to identify the location from which the content can be obtained. In preferred embodiments, the content is stored on servers contactable via the Internet, and the location indicator is a URL address.

It will be appreciated that when a content is provided to the device, some predetermined action will need to be taken by the device in order to correctly receive and store the content. The system of preferred embodiments of the present invention facilitates this by providing a number of packagers for associating with a content information required to handle the content when received by the device. Hence, when a content is retrieved to the device using a content identifier in the profile, the device not only receives the content but also any related information required to ensure correct handling of the content within the device. This content and related information provided to the device will be referred to hereafter as "a package".

As mentioned earlier, the distribution of a plurality of different types of content may be managed by the system. Accordingly, in preferred embodiments, a packager is provided for each type of content.

It will be appreciated that the information provided within the package to describe how the content should be handled can take a variety of different forms, depending on the content itself. For example, if the content is a data file for a particular application, for example a Microsoft Word file, then the package will identify the content as being of that type, and the type information can be used by the device manager to determine whether an installer exists for installing content of that type. If not, the content would typically just be stored in a default location, for example one specified by the device manager. However, if an installer is available, then that will be used to install the content on the device. Assuming an installer is to be used, the information in the package may also identify the required version number of Microsoft Word that is required to read the file. The installer would then try to locate that version of Word, and, for example, warn the user of the device if it is not found.

As another example, if the content is an application program, then it will generally need to be appropriately installed on the device by an installer. In such cases, in preferred embodiments, the information associated with such content may comprise an identification of which file is the main executable file, an identification of an icon to be used to represent the program on the desktop, etc. The relevant installer can then use that information to enable it to correctly install the application program.

It will be appreciated that since devices may be changed over time, and/or the use of any particular device may change over time, which may necessitate the association of different content with the device it is necessary to be able to efficiently manage the hierarchical structure in the database in order to take account of such changes. Accordingly, the system of preferred embodiments has a management tool for providing an interface to enable a user to manage the hierarchical structure stored on the database. Hence, for example, if the hierarchical structure is used to represent a large number of devices within an organisation, a user in the form of a system administrator may use the management tool to manage the hierarchical structure to ensure that each device continues to be represented at an appropriate point in the hierarchical structure so that that device will receive the content that it is desired to provide to that device.

It will be appreciated that there are many different ways in which the hierarchical structure may be developed. However, in preferred embodiments, said elements within the hierarchical structure include one or more divisions, each division representing a logical grouping for devices, the management tool enabling divisions to be created and deleted, and enabling content identifiers to be associated with each division. Accordingly, at the top of the hierarchical structure, it is possible for a generic division to be provided within which all devices will fall, and then for particular divisions to be created depending from that generic division. For example, a technical support division may be provided to include all devices used by technical support staff, whilst a separate customer support division may be created to include all devices used by customer support staff. It should be noted that the user, e.g. the system administrator, is able to create and delete divisions as and when required in order to develop an appropriate hierarchical structure within which to categorise the devices to be represented within the hierarchical structure.

It should be noted that since content identifiers can be associated with each division, content that is to be common for all devices within a particular division need not be specified individually for each device, but rather can merely be specified once in connection with the corresponding division. In preferred embodiments, the profile generated by the server contains any content identifiers associated with the device and any content identifiers associated with a division from which the device depends in the hierarchical structure. It will be appreciated that this significantly improves the efficiency with which content can be associated with any particular device. Further, if a device is moved from one division to another, then the next time a profile is generated for that device, it will automatically receive an updated profile indicating the content that is relevant to that device in its new role. Any new content will then automatically be retrieved, whilst old content will be removed.

In preferred embodiments of the present invention, the management tool enables person identifiers identifying individuals to be provided as elements in the hierarchical structure, whereby the management tool can be used to associate, within the hierarchical structure, the device with the individual owning that device. The inclusion of this extra classification is useful, since often a particular individual in an organisation may have more than one device, and may submit requests for each of his/her devices to be provided with particular content. Since the individual devices can then depend from the relevant person identifier in the hierarchical structure, it is straightforward for the system administrator to then associate that new content with each device. Further, as individuals move around within the organisation, the system administrator is able to move the relevant person identifier between divisions. This will automatically cause all of that person's devices to also move, and for the relevant content for those devices to then be provided the next time that a profile is provided to those devices.

It will be appreciated that there are a number of mechanisms which could be used to provide the profile to the devices at predetermined intervals. For example, if a device is permanently connected to the network, then the server could be arranged to generate the profile at periodic intervals. However, in preferred embodiments, the system supports devices of many different types, at least some of which may not be permanently connected to the network. Given this situation, it is hence necessary for the profiles to be generated and distributed as and when the device is connected to the network. Accordingly, in preferred embodiments, the device manager is arranged to make a connection with the server at predetermined intervals in order to request the profile, the device manager identifying the device for which the profile is required.

Hence, for example, the device manager may request the profile immediately after the device has been powered, such an approach being suitable for bandwidth restricted devices that can only operate with the availability of a network. e.g. GSM receivers. Alternatively, the device manager may request a profile immediately after a network connection has been established, such an approach being suitable for those devices that are fully operational without network availability, but are assumed to make occasional connections, e.g. portable computers. Alternatively, as another example, the device manager may be arranged to request the profile on a periodic basic after discrete time intervals, such an approach being suitable for high bandwidth, permanently connected devices, for example cable television receivers and network computers.

As mentioned earlier, the distribution of a plurality of different types of content may be managed by the system. In preferred embodiments, at least one of the types is computer programs.

The database used to store the hierarchical structure may take a variety of forms. However, in preferred embodiments, the database is a relational database. It should be noted that in this preferred embodiment, this database is entirely separate to any directory services database that may also be provided as a "White Pages" database for resources within an organisation. It has been found to be beneficial to keep this database separate to the directory services database, since this frees the database from being bound by the structure already present in the directory services database. Instead, whilst certain details about resources in the organisation may be obtained from the directory services database for use in the database used to manage content distribution, the actual hierarchical structure within the database is then free to be determined having regard solely to the devices to be managed, and the content to be distributed. This enables a very efficient hierarchical structure to be generated.

Viewed from a second aspect, the present invention provides a computer program product for controlling a server to be used in a system according to the first aspect of the present invention, the computer program product being configured in operation to generate a profile for the device with reference to the database, and to transmit the profile to the device manager.

Viewed from a third aspect, the present invention provides a computer program product for controlling a computer to act as a management tool in the system according to the first aspect of the present invention, the computer program product being configured in operation to provide an interface to enable a user to manage the hierarchical structure stored on the database.

Viewed from a fourth aspect, the present invention provides a computer program product for providing within a device a device manager for use in the system according to the first aspect of the present invention, the computer program product being configured in operation to receive a profile from the server, and to use the content identifiers in the profile to cause the content indicated by the profile to be provided to the device, the computer program product further being configured in operation upon receipt of a subsequent profile from the server to compare the content identifiers in the subsequent profile with a record identifying the content provided to the device in accordance with a previous profile to determine new content not yet provided on the device and old content no longer to be provided on the device, and to use the relevant content identifiers to cause the new content to be provided to the device, and to cause the old content to be removed.

Viewed from a fifth aspect, the present invention provides a computer program product for controlling a computer to act as a packager for use in a system according to a first aspect of the present invention, the packager being arranged to associate with a content information required to handle the content when received by the device.

Viewed from a sixth aspect, the present invention provides a method of managing distribution of content to a device, comprising the steps of: storing in a database a number of elements as a hierarchical structure, content identifiers being able to be associated with elements in the hierarchical structure, and one of the elements representing the device; referencing the hierarchical structure in the database to generate a profile for the device, the profile containing a number of content identifiers indicating content to be provided to the device; with reference to the content identifiers in the profile, causing the content indicated by the profile to be provided to the device; maintaining a record identifying the content provided to the device in accordance with the profile; upon receipt of a subsequent profile, comparing the content identifiers in the subsequent profile with the record to determine new content not yet provided on the device and old content no longer to be provided on the device, and using the relevant content identifiers to cause the new content to be provided to the device, and to cause the old content to be removed.

BRIEF DESCRIPTION OF THE DRAWINGS

The present invention will be described further, by way of example only, with reference to a preferred embodiment thereof as illustrated in the accompanying drawings, in which:

FIGS. 4 to 8 illustrate a user interface used in preferred embodiments of the present invention to enable a system administrator to manage the hierarchical structure stored on the database;

FIGS. 13A to 13D are flow diagrams illustrating in more detail the procedure performed within a network device in order to act upon a received profile from the server;

DESCRIPTION OF A PREFERRED EMBODIMENT

Figure 1A:
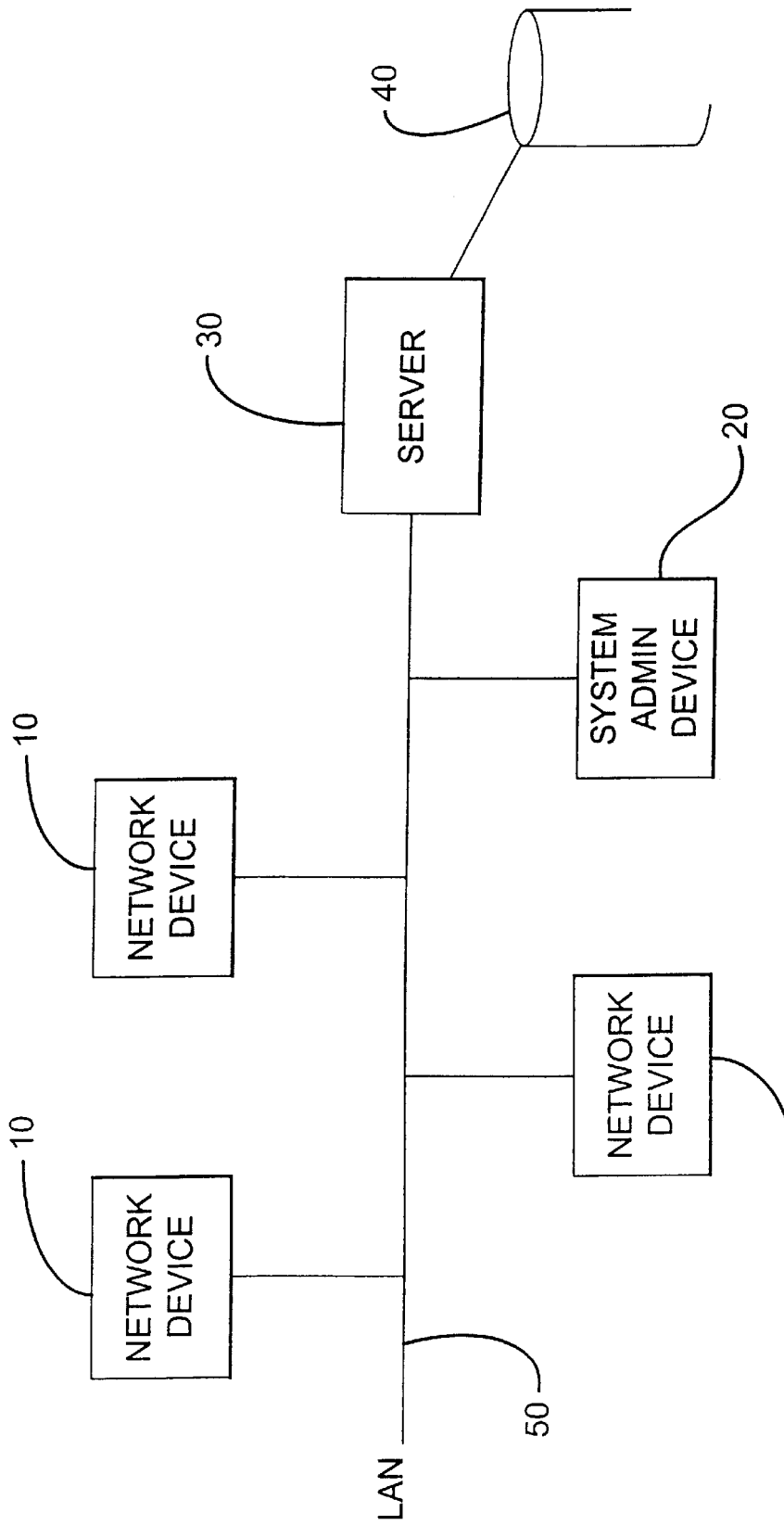
FIGS. 1A, 1B and 1C are block diagrams providing schematic illustrations of embodiments of the present invention.

In the past, a relatively static number of fixed computer devices were managed by a localised support structure able to configure the complex desktop environments. The future, however, presents us with the prospect of having a profusion of devices, whether they be computer devices, or other electronic devices such as mobile phones, personal digital assistant devices (PDAs), electronic organisers, etc. which may or may not be geographically fixed. This will require an alternative management system which is more flexible.

The preferred embodiments of the present invention aim to provide such an alternative management system for distributed management of network devices within a network. The term "network device" as used herein is intended to refer to a device whose content is managed by the system of preferred embodiments of the present invention, but is not intended to imply that any such device is permanently connected to a network. For the purposes of preferred embodiments of the present invention, it is sufficient that any such "network device" is capable of making at least occasional connections to a network, either directly or via some other device. For example, certain devices may delegate their management to other devices which in turn must be able to make occasional network connections. For example, certain PDA-style devices are not inherently networkable, but rely on a PC to do certain things for them, such as install new programs. Since the PC can make occasional network connections, such PDAs will also be "network devices" which can be managed by the system in accordance with preferred embodiments of the present invention.

Each network device is in preferred embodiments provided with a client program (which may alternatively be referred to herein as a device manager) which is arranged to communicate with a server, the server maintaining details of content (for example, programs or data) desired to be present on each device. In preferred embodiments, the client program identifies to the server the network device, and the server sends a profile of the content desired to be present on that device. The client program then preferably configures the network device so that it contains the content identified in the profile, any content not currently present on the device, but identified in the profile, being retrieved in a predetermined manner.

In preferred embodiments of the present invention, the client program and server operate on the Java™ platform. The ubiquity of Java™ across platforms as various as cable television receivers and mobile telephones, allows the possibility to centrally control almost any kind of device entirely remotely, provided that at least occasional successful network connections are established to enable that control to take place.

In preferred embodiments of the invention, the client program on each network device is responsible for autonomously updating the device's configuration. Dependent on the kind of device, the client program executes at defined intervals, namely either:

1. immediately after the device has been powered;
2. immediately after a network connection has been established; or
3. after discrete time intervals.

The first scenario is designed for bandwidth restricted devices that can only operate with the availability of a network, e.g. GSM receivers. The second will be used for those devices that are fully operational without network availability, but are assumed to make occasional connections e.g. portable computers. The third scenario is designed for high bandwidth, permanently connected devices like cable television receivers and network computers.

The client program communicates the identity of the device to a server, which replies with a profile of content (for example programs or data) that are desired by the network authority to be present on this device. The server does not transmit the content, rather the location from which each one can be retrieved. The client records each content it fetches, so is able to selectively fetch new or updated content, and delete content no-longer required, thus abrogating all responsibility of the device (user to manage the device.

Figure 10:
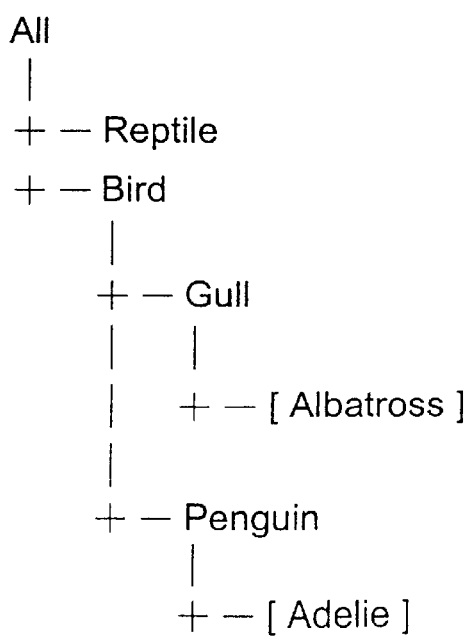

The network authority is the entity with responsibility for defining the profile of the devices. This task is made simpler through the use of a hierarchical definition/structure, i.e.

each device is represented as a member of a logical grouping called a division. Each division may in turn be a member of another division, in the manner of a linear tree, until the common ancestor is reached. A profile may be defined for each division. Thus a profile for a device consists of any content explicitly designated to it within the hierarchical definition, plus that of its division, plus the parent division and so on until the root division. For example, with reference to FIG. 10, where device names are enclosed with brackets, the profile of Adelie is defined not only by its own configuration, but also that of Penguin, Bird and All. Therefore, if Adelie became part of the Gull division, it would still inherit the configuration of Bird and All but would now include that of Gull rather that Penguin.

Figure 1B:
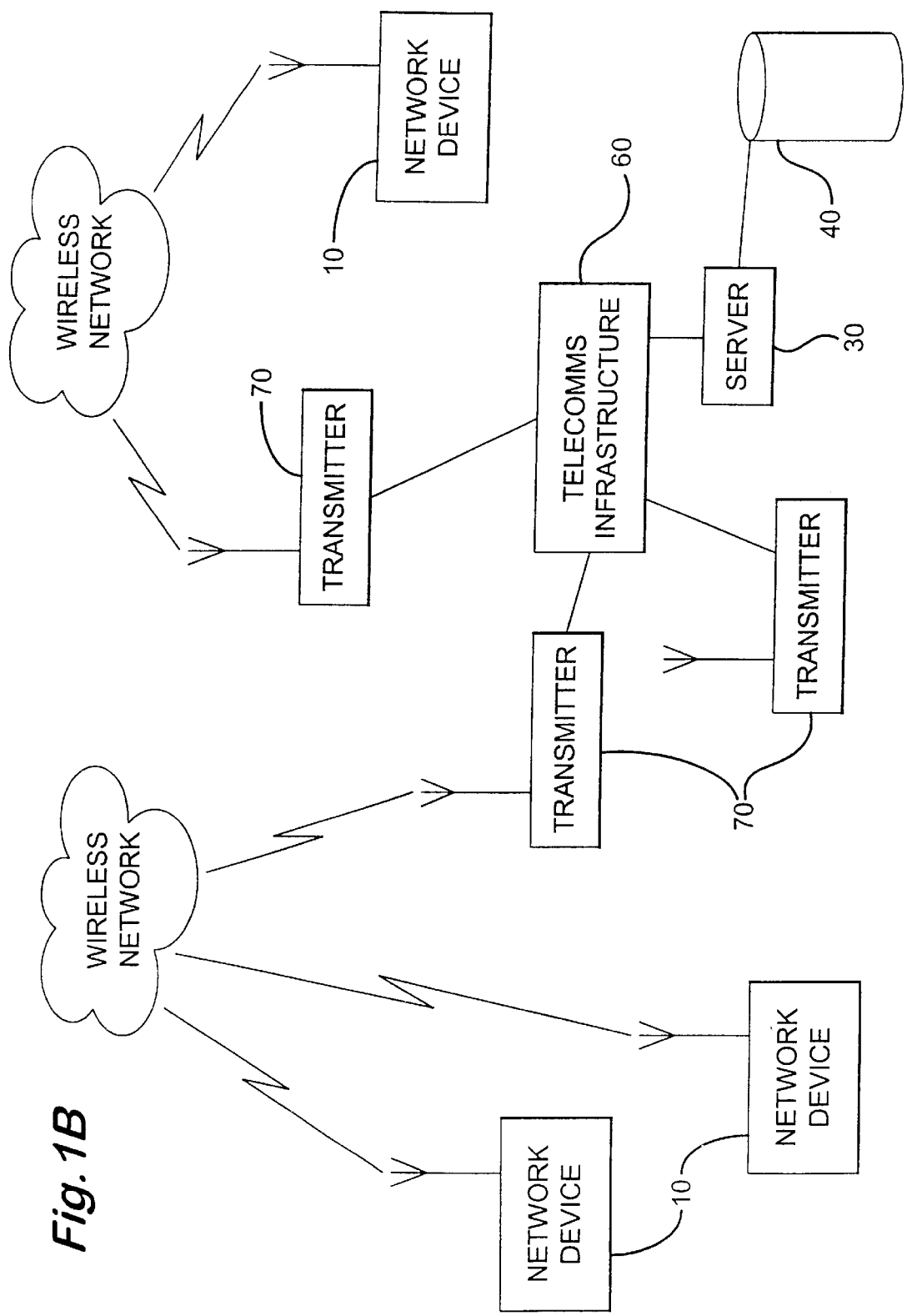
Figure 1C:
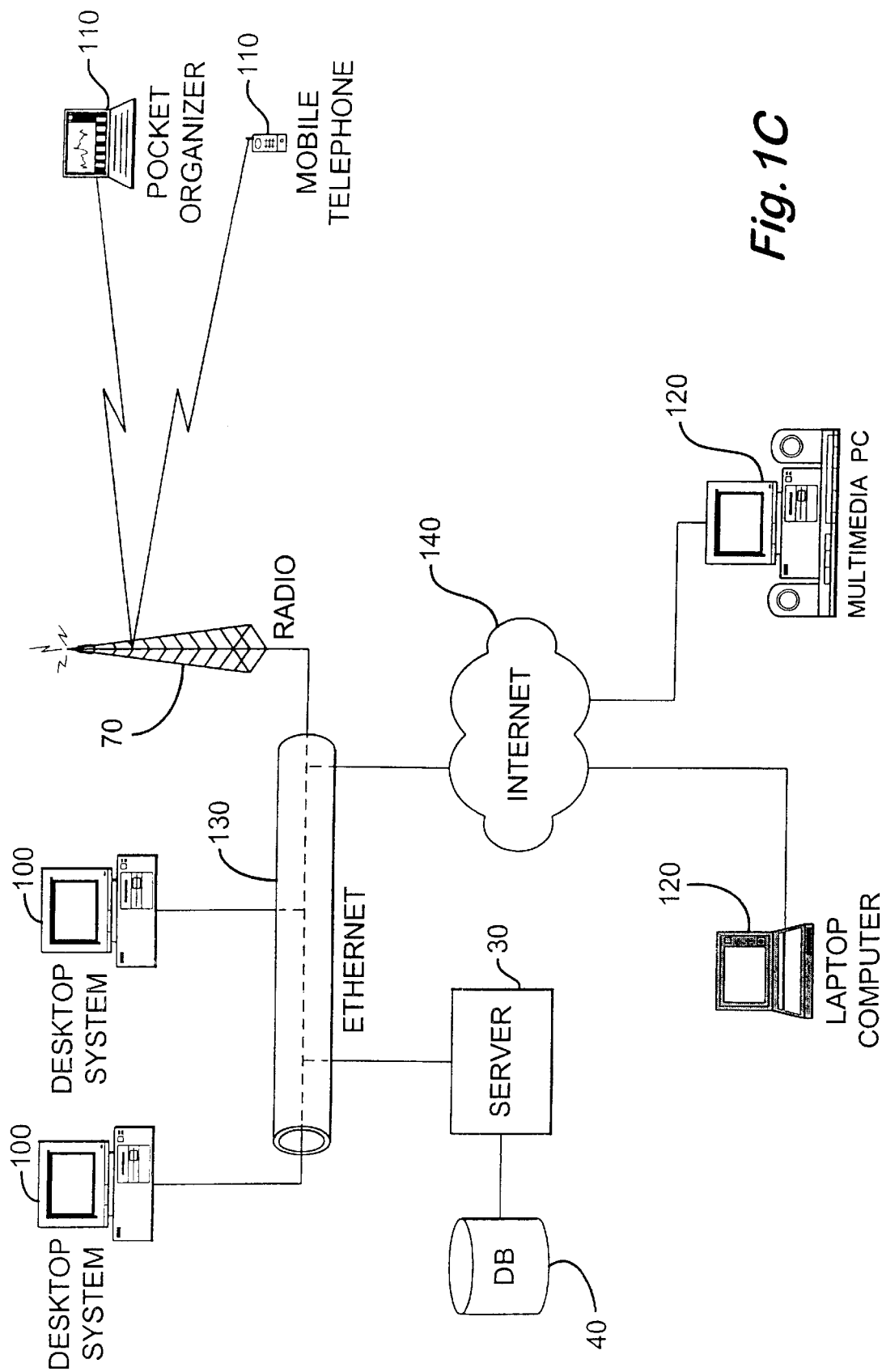

Schematic overviews of example embodiments of the system of the present invention are illustrated in FIGS. 1A to 1C.

FIG. 1A illustrates one possible embodiment of the present invention, in which a number of network devices 10 are linked via a LAN 50 with a server 30. In this embodiment, the network devices are likely to be PCs, but need not be, and indeed could be any other suitable electronic device, for example a router, an intelligent hub, etc. Further, the network devices could be personal organisers, PDAs, etc., which may connect to the network via a PC.

The server 30 is connectable to a database 40 containing a hierarchical definition identifying the devices and the content to be associated with those devices. A system administrator can manage the hierarchical definition by connecting to the server 30 via a system administration device 20. The location of the system administration device can be varied, but in the FIG. 1A example, the system administration device is connected to the server via the LAN 50.

Each network device 10 will in preferred embodiments have a client program installed thereon and arranged to communicate with the server 30 in order to obtain a profile for the respective network device, the profile being derived by the server having regard to the hierarchical definition. Hence, the system in accordance with FIG. 1A provides for the distributed management of those network devices, since the hierarchical definition is maintained centrally, and then client programs are distributed amongst the relevant network devices. Further, the hierarchical definition can be directly managed from the server, or alternatively can be managed from some distributed point, such as the system administration device 20.

FIG. 1B provides an illustration of an alternative embodiment in which the present invention may be used. In this embodiment, the network devices are connected via a mobile telecommunications network, and the network devices 10 will be electronic devices arranged to communicate over the mobile network, for example mobile phones, or laptop computers with mobile telecommunication capability. In this embodiment, the server 30 is connected via a telecommunications infrastructure 60 to a number of transmitters/receivers 70 used to communicate with the network devices 10. The system operates in basically the same way as that described with reference to FIG. 1A, with each network device 10 being provided with a client program to enable it to communicate with the server 30. It should be noted that the system administration device used by the system administrator to manage the hierarchical definition within the database 40 may be anywhere within the network, and hence may be on the server 30, or may indeed be provided by a network device anywhere within the telecommunications network.

In preferred embodiments of the present invention, many different types of devices may be managed, which may connect to the server 30 via different mechanisms. This is schematically illustrated by the embodiment shown in FIG. 1C. Here, certain network devices 100, for example desktop systems, may connect to the server directly via an Ethernet connection 130. Further, other network devices 110, for example pocket organisers, mobile telephones, etc. may connect to the server via wireless communications with a transmitter/receiver 70. In addition, other network devices 120, for example a laptop computer or a multimedia PC, may connect to the server via the Internet 140.

Figure 2:
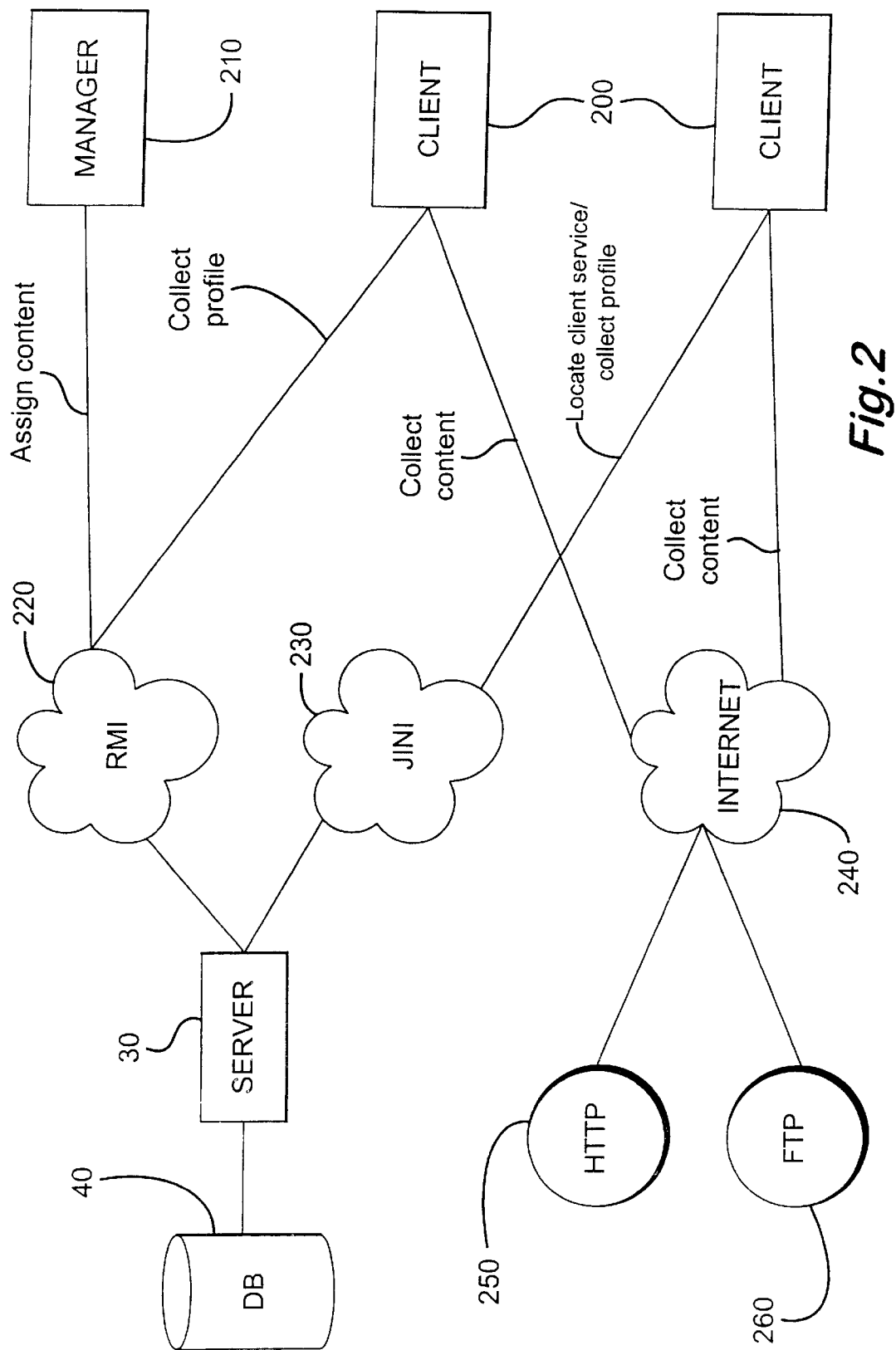
FIG. 2 is a further block diagram providing an architectural overview of a system in accordance with preferred embodiments of the present invention.

As mentioned earlier, the system of preferred embodiments is available for devices that support at least occasional network connections. In preferred embodiments, the system uses Java and Internet technologies to enable the remote management of a diverse range of devices. FIG. 2 provides an illustration of the architectural overview of the system of preferred embodiments. The server 30 uses Java's Remote Method Invocation (RMI) and Jini connectivity to make itself available to client programs 200 as a configuration service. RMI is a Java mechanism that allows two programs to communicate transparently over a network. Jini is a software infrastructure that allows services to be made available across the network, the reader being referred to the website http://www.sun.com/jini/ for more details.

Further, the server uses standard Internet protocols such as HTTP or FTP to distribute content. Hence, as illustrated in FIG. 2, a client program 200 resident on a network device may connect to the server 30 via either RMI 220 or Jini 230 mechanisms in order to request and receive a profile from the server. Further, a management tool 210 (preferably a computer program) on a system administrator's device may, for example, use an RMI mechanism 220 to assign new content to elements (e.g. divisions, devices) within the hierarchical structure maintained on the database 40. Additionally, when the profile has been received, the client program 200 may collect content from servers 250, 260 via the Internet 240 using the standard Internet protocols such as HTTP or FTP as appropriate.

It should be noted that the system of the preferred embodiment is a highly distributed application. The database 40, the server 30, the management tool 210, and indeed any directory server that may be used to obtain information to use within the database 40, can all be located on separate machines.

Figure 3:
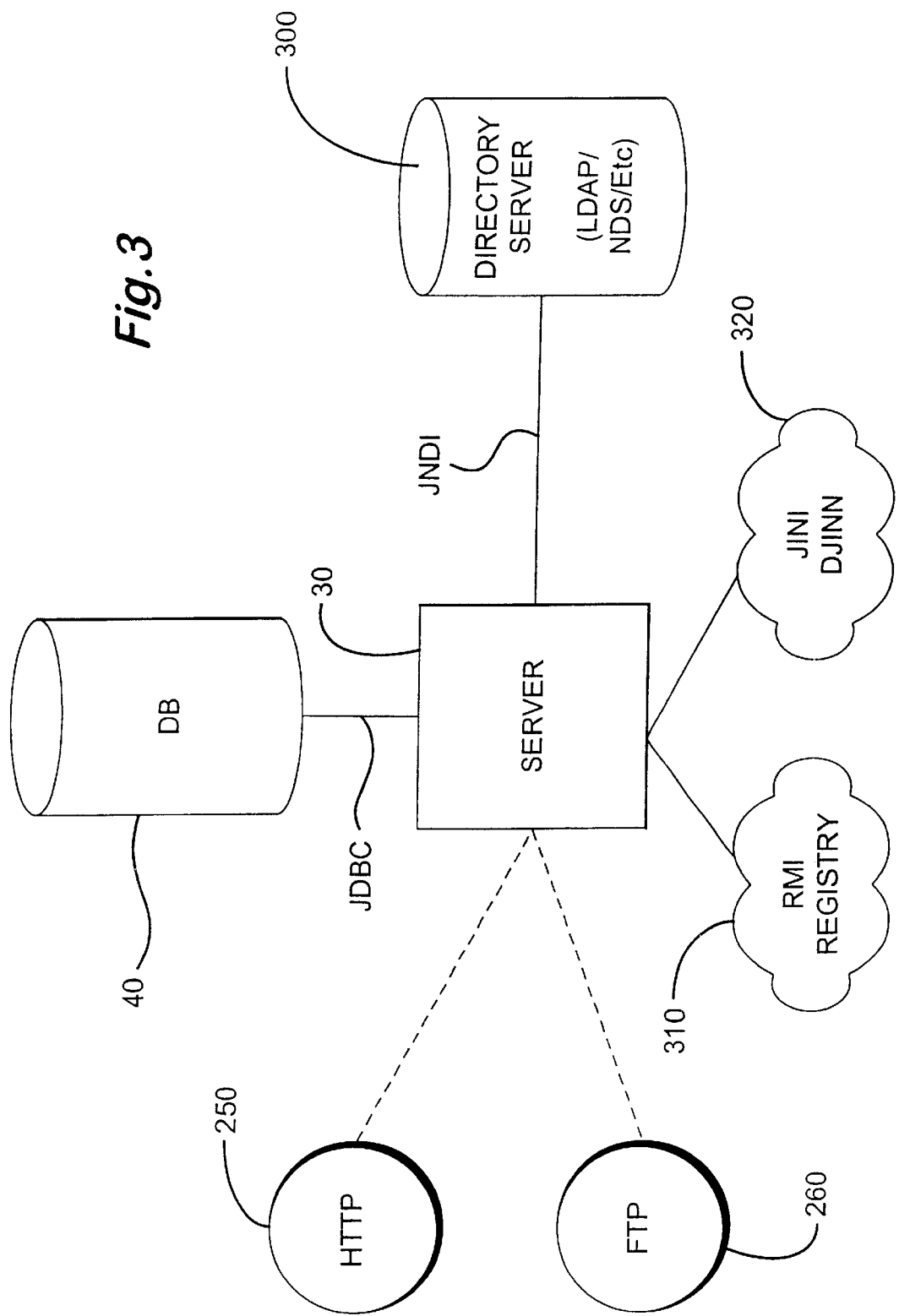
FIG. 3 illustrates in more detail the connections to the server in accordance with preferred embodiments of the present invention.

FIG. 3 provides more details of the way in which the server is connected in accordance with preferred embodiments of the present invention. The server 30 is designed to integrate with existing servers. Hence, a database back-end 40 can be used to store the hierarchical structure used by the server to generate profiles for network devices. Java Database Connectivity (JDBC) facilitates the connection of third-party databases to the server 30. More information concerning JDBC can be found at the web address http://java.sun.com/products/jdbc/.

Further, a standard directory server, such as LDAP (an Internet standard directory server), NDS, etc., can be connected to the server 30 to allow information about particular users within the organisation to be obtained by the server 30. As illustrated in FIG. 3, Java Naming and Directory Interface (JNDI) allows different types of directory servers to be connected to the server 30. For more information about JNDI, the reader is referred to the web address http://java.sun.com/products/jndi/. Whilst it is clear that the hierarchical structure in the database 40 could be created from scratch by the server 30, it is quite likely that an organisation wishing to have their devices managed in accordance with the system of preferred embodiments of the present invention will already have a directory server giving relevant details about the users, etc. Hence, the task of creating the hierarchical structure in the database 40 can be significantly simplified by allowing the server 30 to obtain relevant details about users, etc. from any standard directory server already provided within the organisation.

Further, it has been found to be highly desirable to store the hierarchical structure used to manage the distribution of content to devices in an entirely separate database 40, rather than by seeking to incorporate the additional information within the rather fixed structure of an existing directory server database, since this facilitates far more flexibility in the creation of appropriate divisions, and locations of devices within divisions, having regard to the devices to be managed, and the content to be distributed to those devices.

In preferred embodiments, standard Internet servers 250 and 260 are then used to store the actual content to be distributed to the devices. The server 30 is then able to communicate with the servers 250, 260, for example via standard Internet connections, to check where content is stored, and to check the format in which that content is stored, etc.

As illustrated in FIG. 3, a standard RMI registry and an optional Jini djinn are used to make the service available to network devices. An RMI registry is a remote program that provides mechanisms for locating other remote programs, and hence facilitates the use of the RMI mechanism to enable client programs to communicate with the server 30. Djinn is the name given to the group of devices, resources and users joined by the Jini software infrastructure.

Considering now the client programs 200 associated with particular network devices, these client programs can connect to the server using one of two methods depending on their configuration. For network devices with built-in client code, Java's RMI mechanism can be used, whilst dynamic, downloadable client software is provided as an alternative through the optional Jini service. Using the Jini approach, a device will already have what is known as a service browser which searches for services that are available. In this case, the client program is not installed locally on the device, but the process may be automated through use of an appropriate configuration present on the device.

On each network device, a small client registry is maintained keeping a record of all content present on the device that has been obtained in accordance with a profile received from the server 30. When the server is contacted, a profile describing what should be present on the device is retrieved. As will be described in more detail later, the new and updated content indicated by the profile is retrieved and defunct content is removed. During this process, any installers and de-installers are preferably automatically downloaded from the server 30 and invoked. It should be noted that all of this happens without any involvement from the user of the network device.

In preferred embodiments, a management tool application is provided to present a simple graphical interface to assist an administrator or the like, to enable the system administrator to build and maintain a hierarchical structure of divisions and devices within the database 40. Content identifiers can then be dragged and dropped on to particular elements representing divisions and/or devices in order to associate content with the elements of the hierarchical structure. Via integration with a standard directory server as illustrated earlier with reference to FIG. 3, the system administrator is able to determine who owns a particular device on the network. Hence, equipping a person's device for a new role simply involves dragging an icon representing that person to a new division. These concepts will be illustrated further with reference to FIGS. 4 to 8, which provide example illustrations of the graphical interface provided by the management tool to enable a system administrator to manage the hierarchical structure maintained by the server 30 on the database 40.

Figure 4:
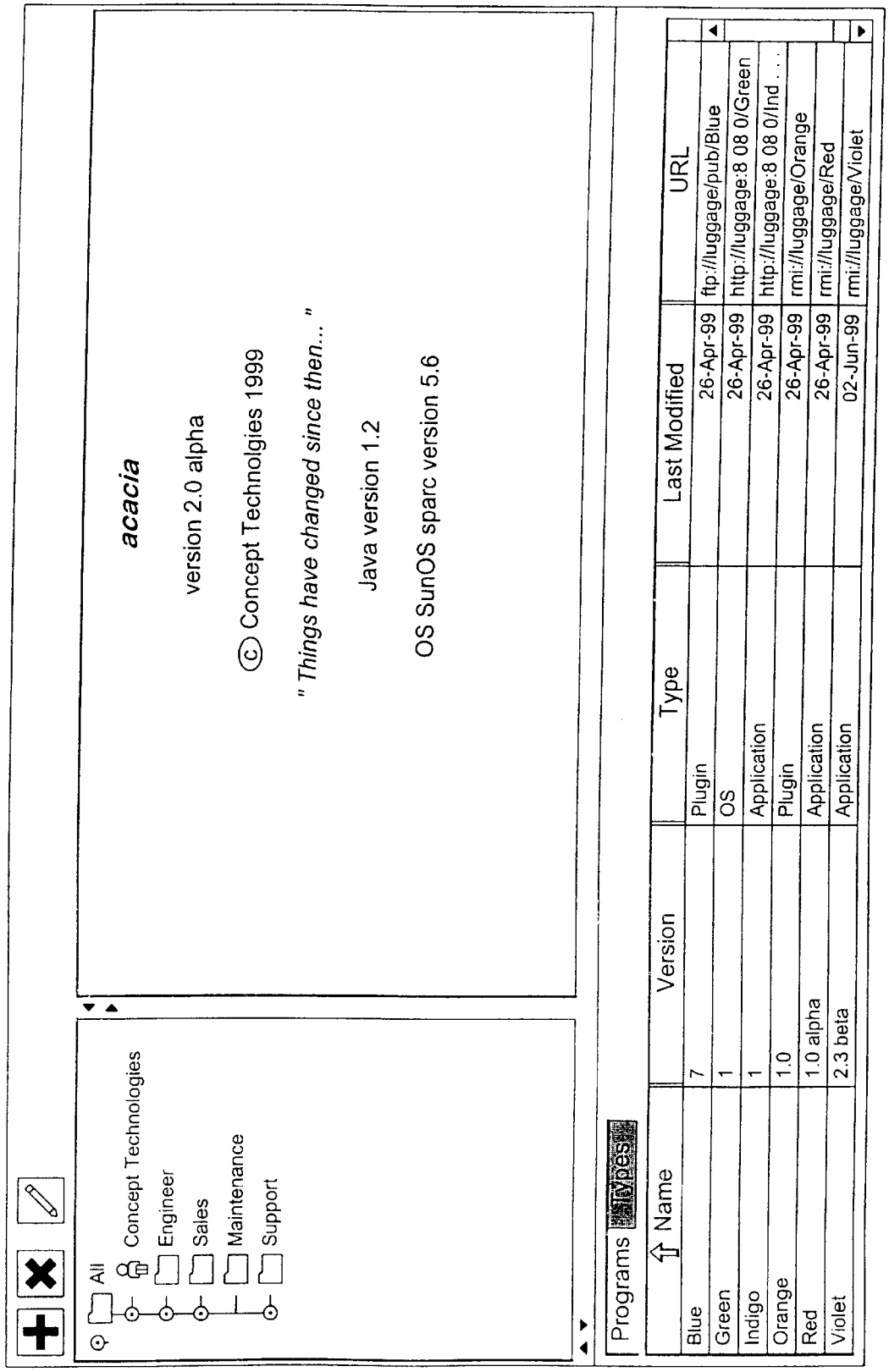

With reference to FIG. 4, the left hand window provides a schematic illustration of the hierarchical definition, whilst the right hand window serves as an information display area. The window at the bottom of the screen contains a list of content identifiers that are available for allocation to elements of the hierarchical structure representing particular devices or divisions (in this example the content being computer programs). As can be seen from FIG. 4, each content identifier includes a name for the content, and a location indicator, in this case a URL address, identifying the location from which the corresponding content can be retrieved. Optionally, the content identifier may include information such as version numbers, type of content, and the date last modified.

Figure 5:
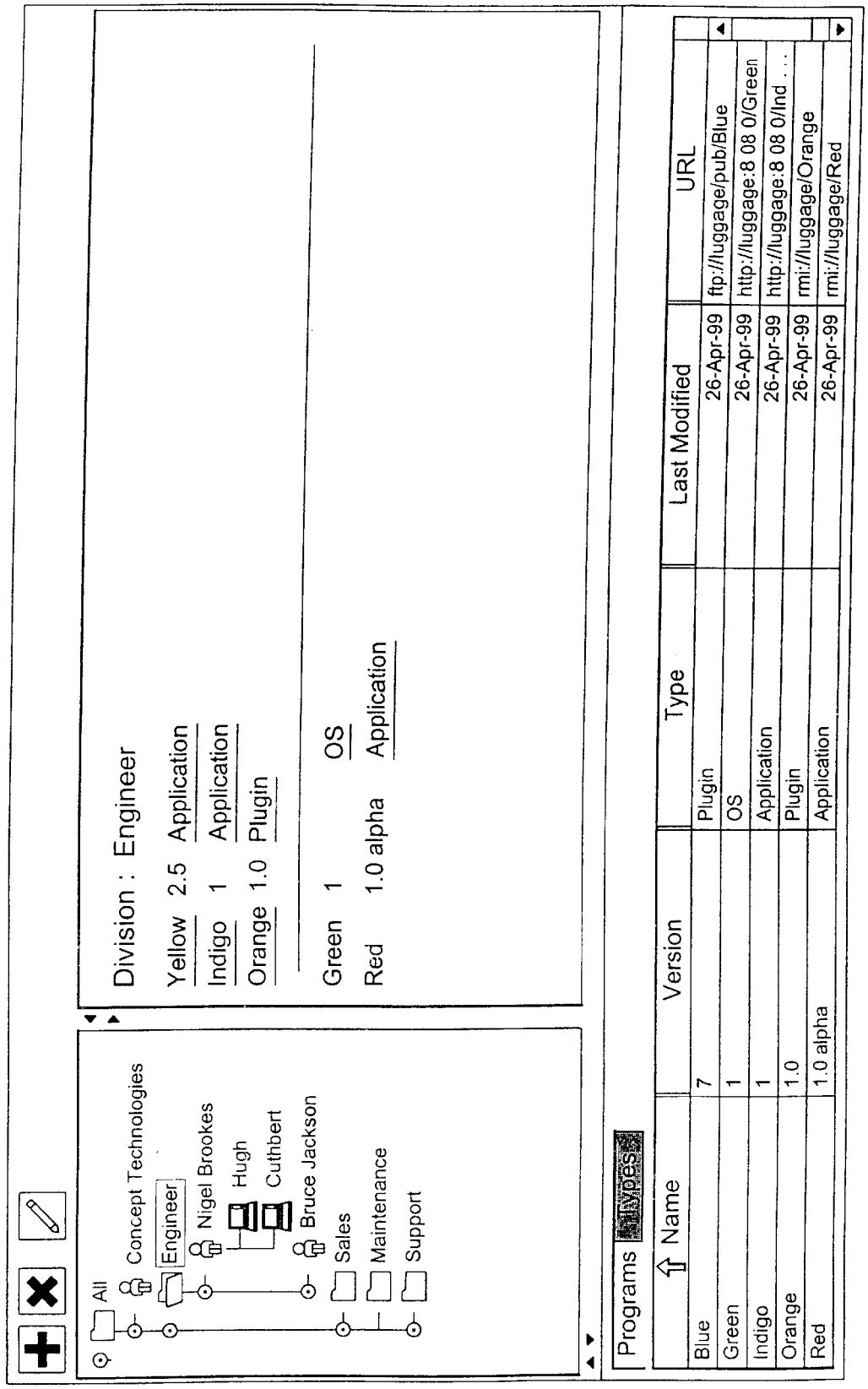

FIG. 5 shows the information that will be displayed when the system administrator selects the "Engineer" division. As can be seen from the information display area, this indicates that the programs "yellow", "indigo" and "orange" are associated with the division "Engineer", and that also the operating system "green" and the application "red" are inherited from the division "All".

FIG. 6 illustrates the information provided if the system administrator were to select an individual, in this case the individual Nigel Brookes, who has two devices associated with him, namely "Hugh" and "Cuthbert". Finally, FIG. 7 illustrates the programs associated with the device "Hugh". It can be seen that the device "Hugh" has the application "violet" associated directly with it, but also inherits the programs associated with the divisions "Engineer" and "All".

Figure 8:
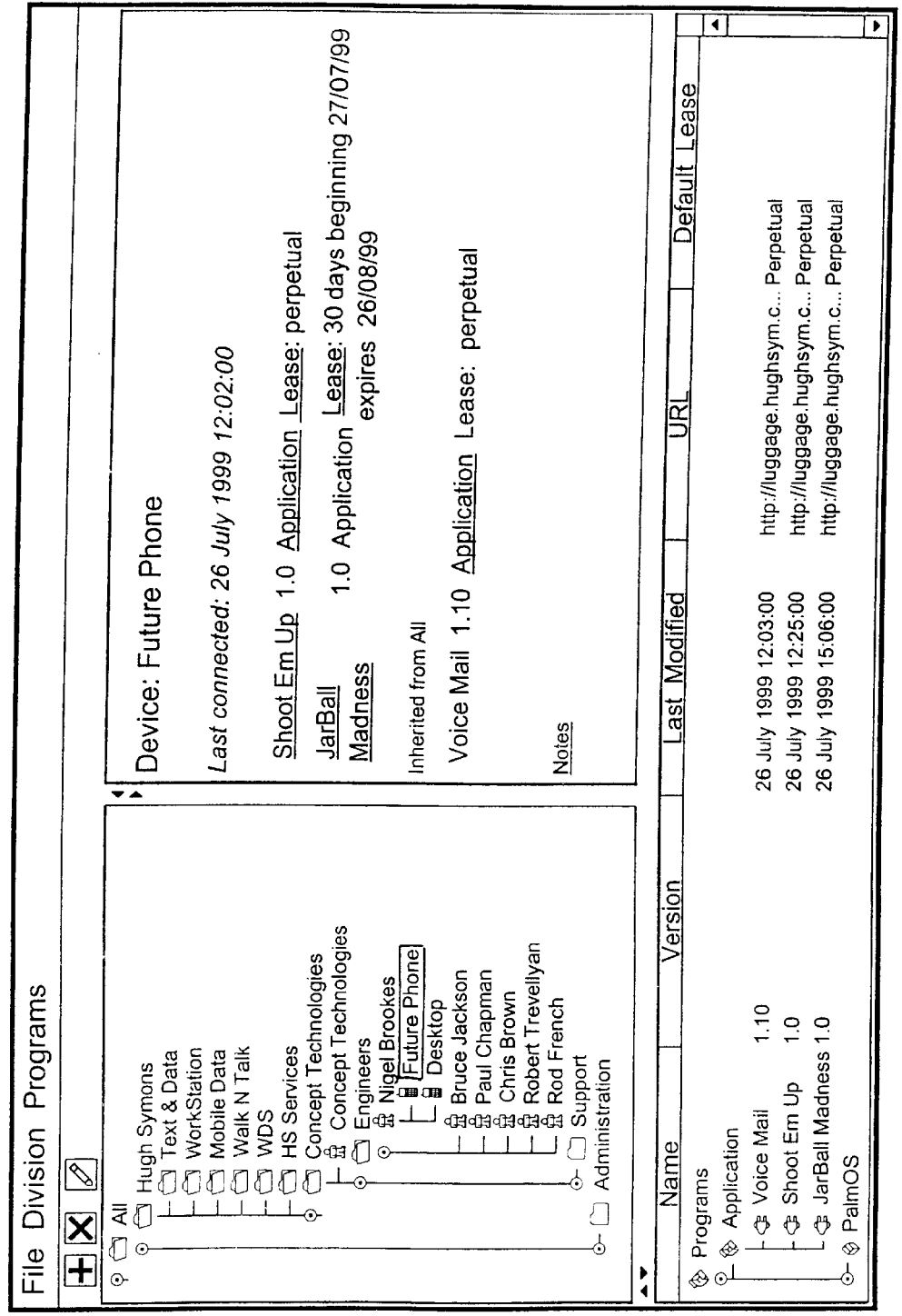

FIG. 8 illustrates the graphical interface that may be provided for an alternative example database structure. Here, a device called Future Phone is indicated as belonging to an individual, Nigel Brookes, who is allocated within the Engineers division, which itself is a division of the Concept Technologies Division. Further, the Concept Technologies Division is contained within the Hugh Symons Division, which is contained within the All Division. As can be seen from FIG. 8, the device Future Phone has two applications associated therewith, and also inherits an application from the division All. In this instance, it is clear that the divisions Hugh Symons, Concept Technologies and Engineers do not have any content associated directly with them, since otherwise the device Future Phone would also have inherited the content from those divisions.

With reference to FIG. 8, it will also be seen that the content identifiers in this case also include optional information identifying a default lease period. This information enables the client program on a network device to automatically remove the content after the lease period expires. Hence, with reference to FIG. 8, it can be seen that two of the applications allocated to the device Future Phone are on a perpetual lease, but that the application JarBall Madness is on a thirty day lease expiring on 26 Aug. 1999. The client program can use this information to automatically remove JarBall Madness from the Future Phone device on that date.

Figure 9:
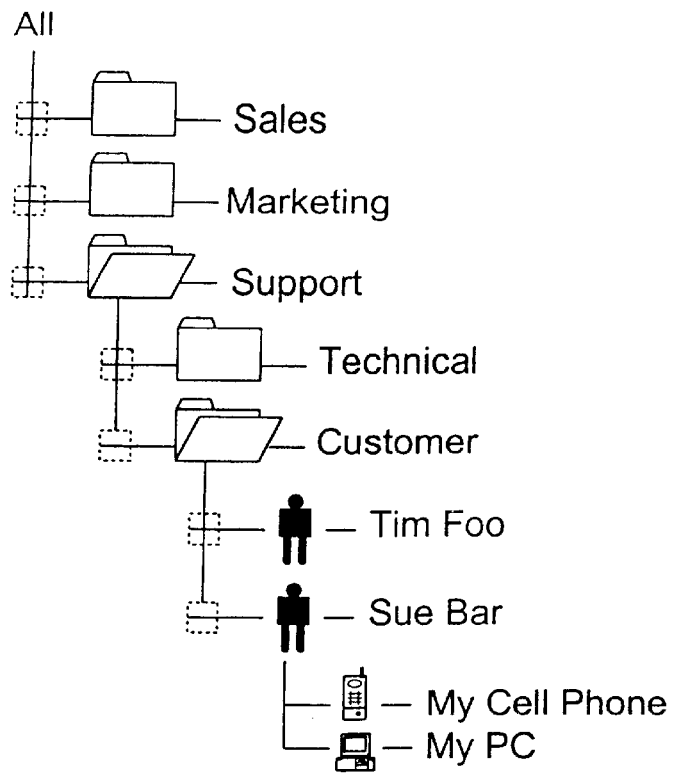
FIGS. 9 and 10 provide an illustration of simplified examples of the hierarchical structure that may be stored within the database.

For completeness, FIG. 9 is also provided to give a simple illustration of a portion of a hierarchical structure that may be maintained within the database 40. As mentioned earlier, devices are organised into logical, hierarchical groupings called divisions. Each division inherits the contents of its parent division. Content can be assigned to these divisions, and to individual devices, which then facilitates the generation of a profile for particular devices.

In FIG. 9, we can see that Sue Bar owns the device "My Cell Phone". She is part of the Customer division and also the Support and All divisions. Her device will therefore have the content assigned to All, Support, Customer and to that specific device. If Sue decided that she would like to make use of a service that will send all SMS (Short Message Service) messages to her e-mail account, she can request that service from the relevant system administrator. The system administrator may decide not to make this service generally available, and so instead will assign it to her cell phone only. When that device next retrieves a profile from the server, it will automatically receive the relevant application.

The system administrator retains responsibility for the entire hierarchy, but is able to delegate the control of sub-divisions to other managers. Hence, referring to FIG. 9, the network administrator could retain responsibility for the All division, but may choose to delegate the management of the Customer Support division and the Technical Support division to one or more different managers.

Figure 11:
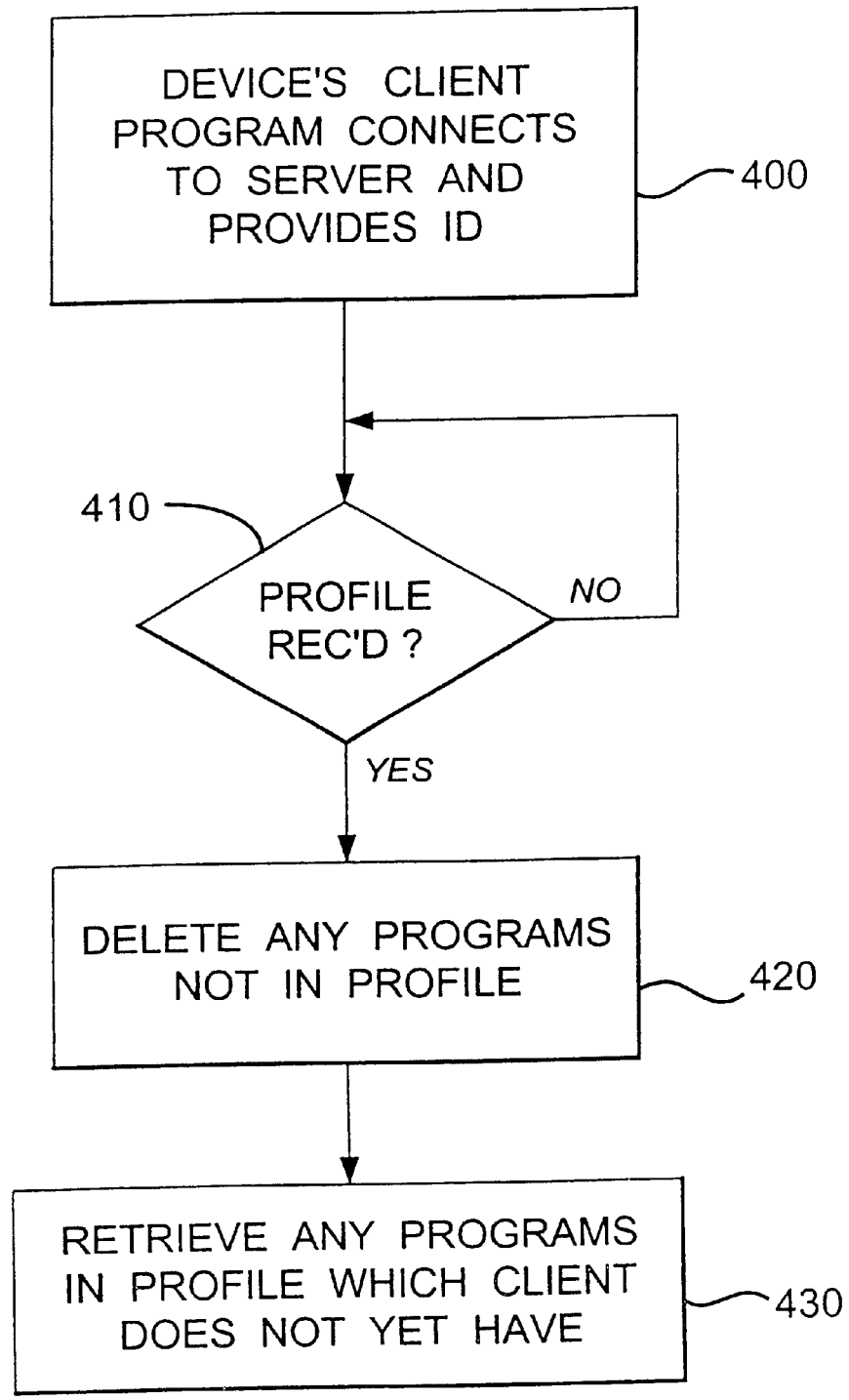
FIG. 11 is a flow diagram illustrating the steps performed within a network device to request a profile, and act upon the profile when received.
Figure 12:
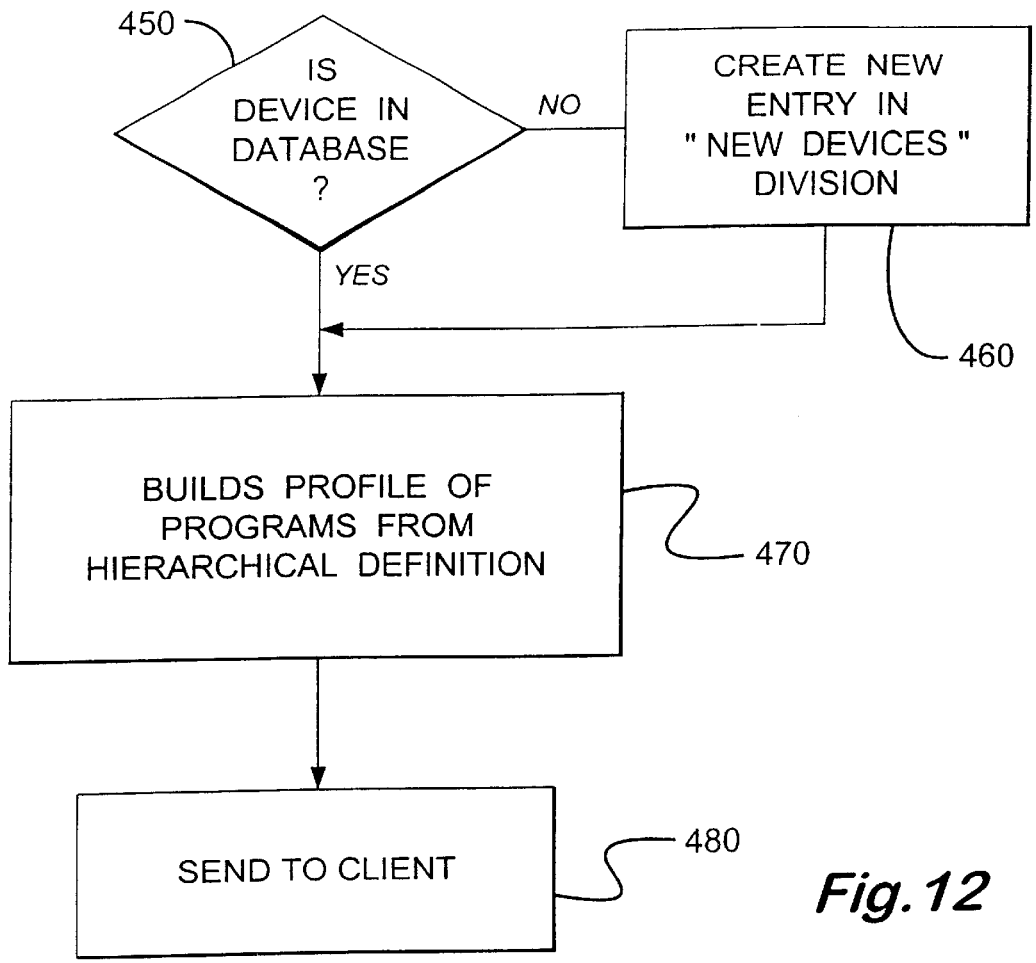
FIG. 12 is a flow diagram illustrating the steps performed within the server in order to provide a profile to the client.

The flow diagrams of FIGS. 11 and 12 provide a brief illustration of the process performed when a client program on a device is executed in accordance with one embodiment of the present invention, FIG. 11 illustrating the processing steps executed by the client program, and FIG. 12 illustrating the processing steps executed by the server. It is clear that not all embodiments need to execute the exact sequence of steps illustrated in FIGS. 11 and 12, but rather FIGS. 11 and 12 are intended to illustrate a particular embodiment. For example, if the server determines that the device is not currently in the database, then it may be arranged to refuse that device access to the network, rather than creating a new entry for that device in the "new devices" division.

With reference to the embodiment of FIG. 12, it will be appreciated that if a "new devices" division were provided, it would generally be provided as a child of the division "All". If any content is associated with the division "All" then this new device will inherit that content. However, alternatively, both the divisions "All" and "new devices" may be arranged to have no content associated with them, such that the new device is not provided with any content at the time that it first contacts the server.

Irrespective of which approach is taken, in preferred embodiments the network administrator would seek to reallocate any devices placed within the "new devices" division to the appropriate division within the hierarchy. For example, having reference to FIGS. 4 to 7, if the new device was actually within the "Support" division, then the support administrator would move that device from the "new devices" division to the "Support" division, so that in subsequent accesses, that new device will be arranged to receive the content appropriate to the "Support" division.

Figure 13B:
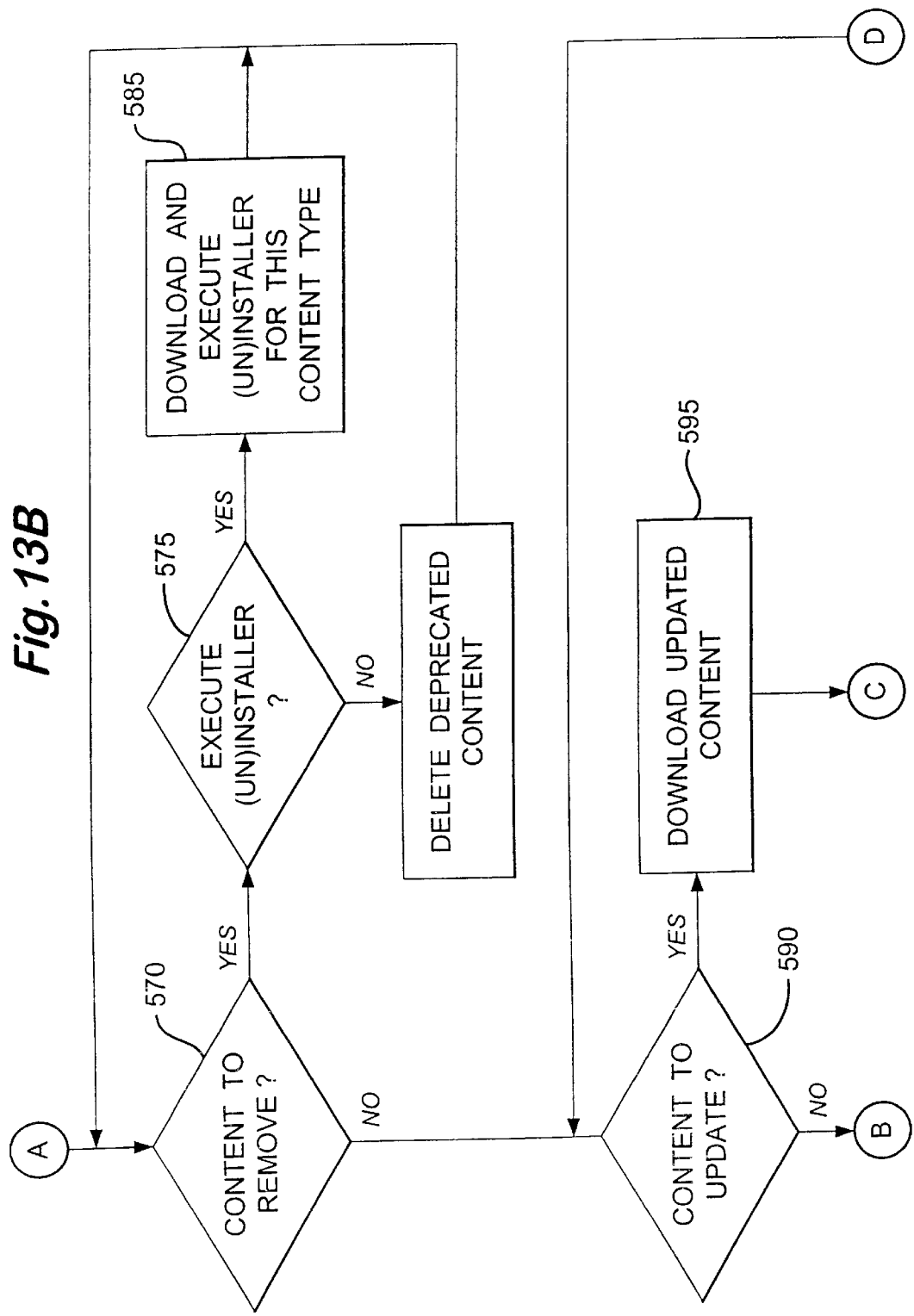
Figure 13C:
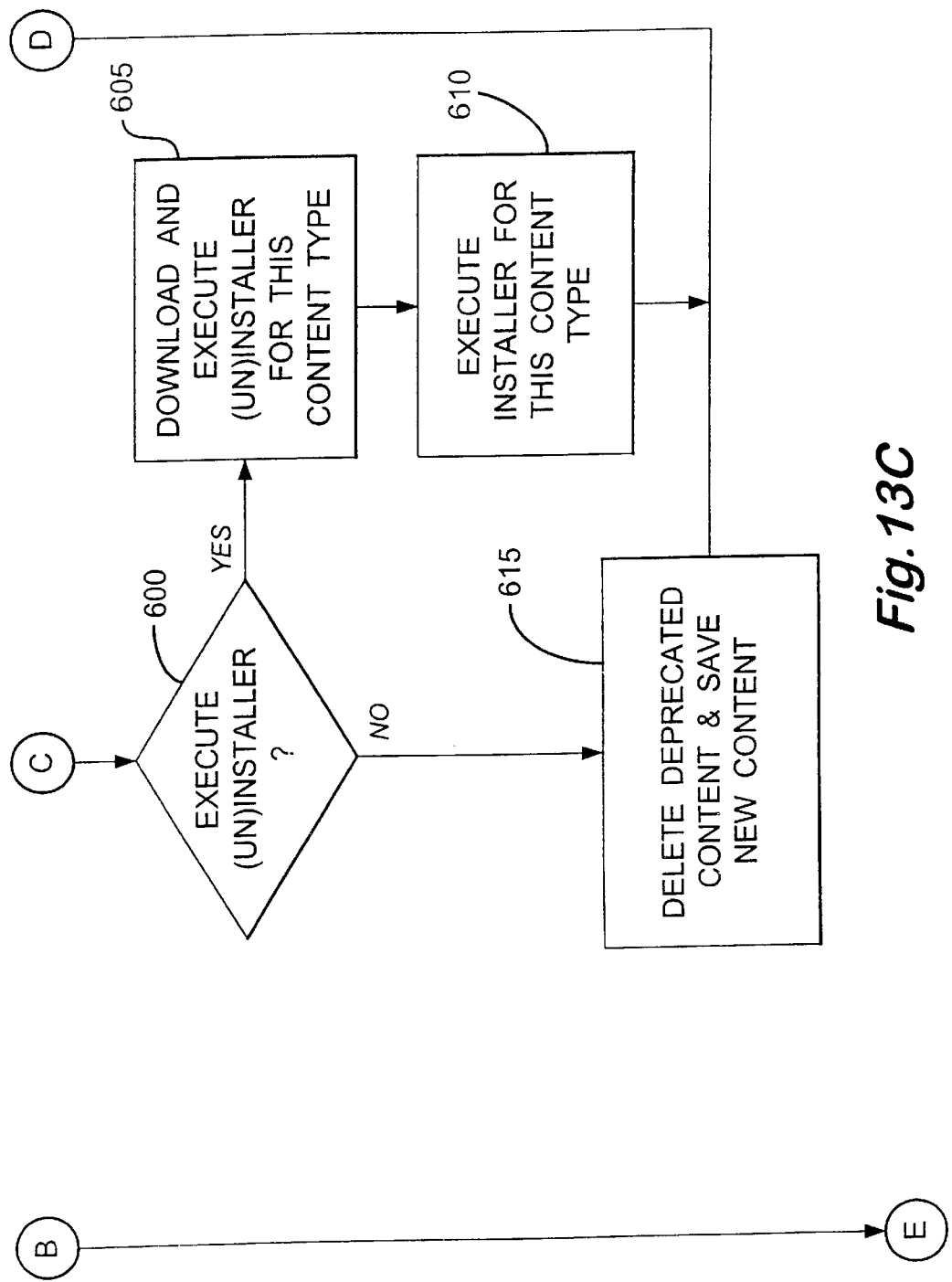
Figure 13D:
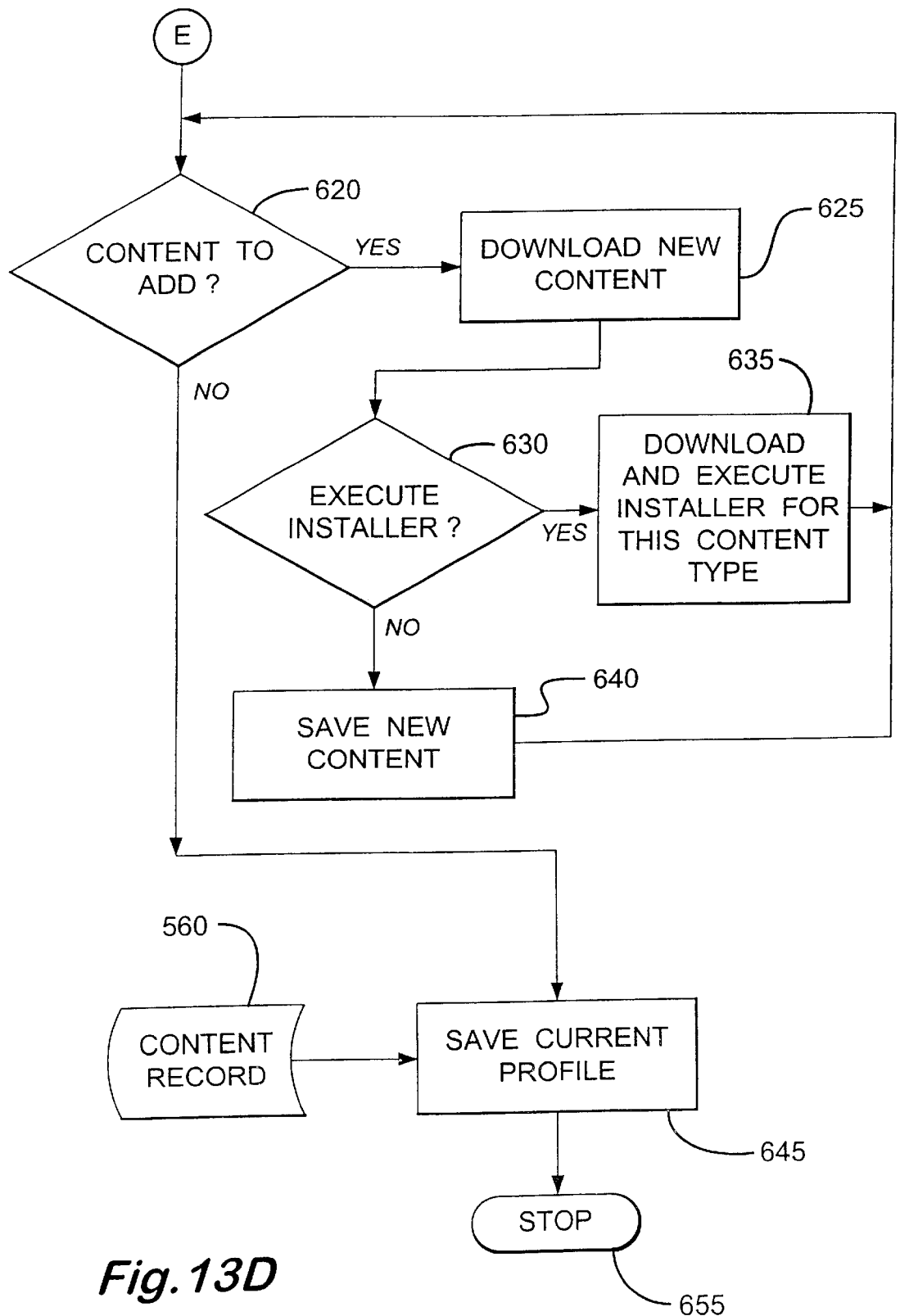
Figure 14:
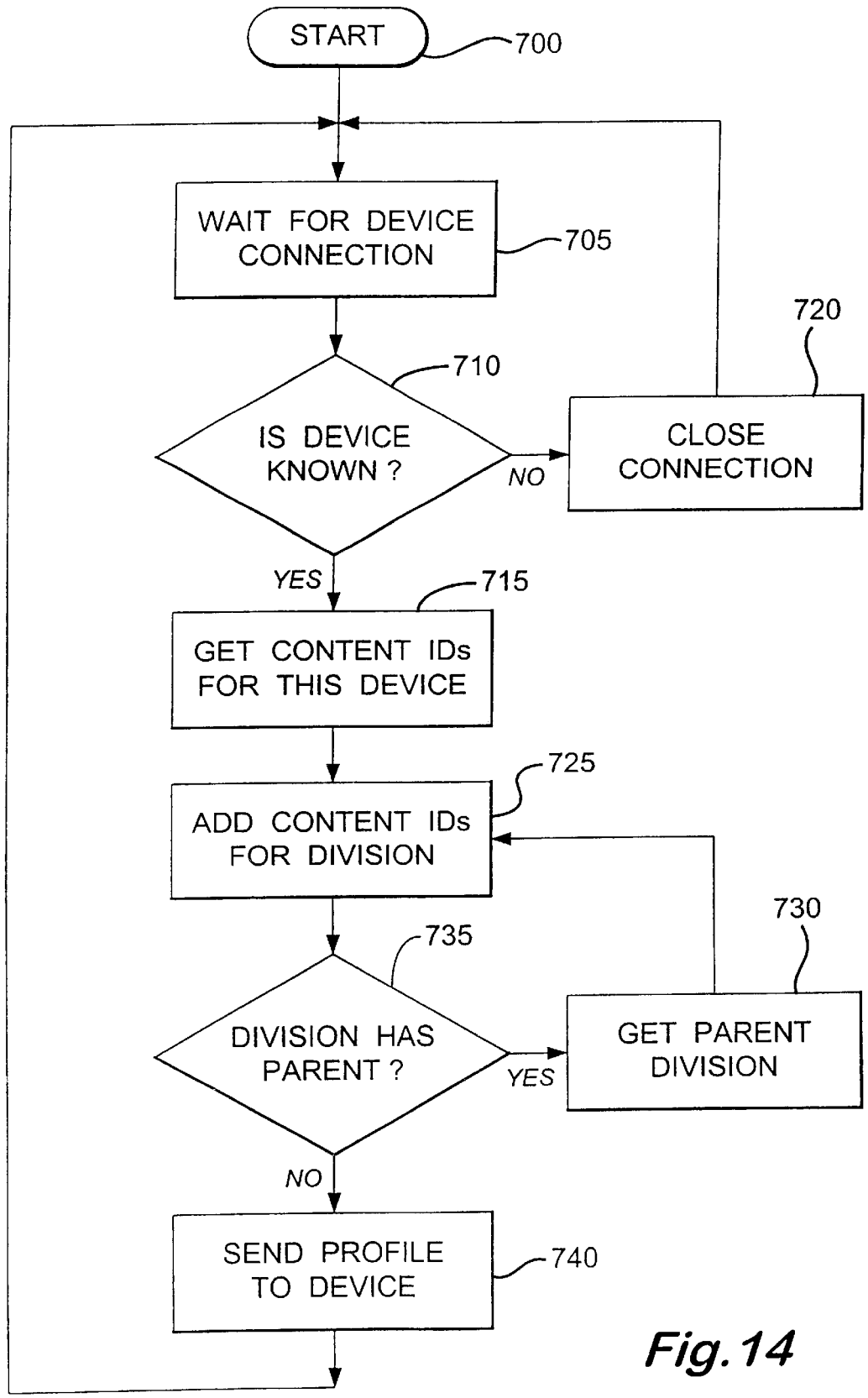
FIG. 14 is a flow diagram illustrating in more detail how the profile is prepared by the server in accordance with preferred embodiments of the present invention.

FIGS. 13 and 14 are flow diagrams providing a more detailed illustration of the process that may be performed when a client program on a device is executed. FIGS. 13A to 13D can be considered as a more detailed illustration of the embodiment illustrated in FIG. 11, whilst FIG. 14 illustrates a different embodiment to that illustrated in FIG. 12, in that rather than allocating unknown devices to a new devices division, the process illustrated in FIG. 14 merely terminates the process, and hence the process can only be used once devices have been allocated by the system administrator to an appropriate location in the hierarchical structure.

With reference to FIG. 13A, when the client program executes, it starts at step 500, and proceeds to step 510, where it is determined whether there is any available network. If not, the process terminates at step 520, and the process will begin again next time that the client program executes. As mentioned earlier, the client program is preferably arranged to execute at predetermined intervals, these intervals being determined dependent on the type of device.

If the network is available, then the process proceeds to step 530 where the device seeks to download the profile from the server 30. At step 540, it is determined whether the download process has been successful, i.e. whether a profile has been received from the server, and if not, the process loops back to step 530. It will be appreciated that if there is some temporary problem with either the server or the network which inhibits the profile from being delivered to the client program, then the client program could stall at this point. Accordingly, it may be appropriate in some embodiments to provide a time-out mechanism here, whereby the process branches to step 520 if no successful downloading of the profile has been achieved within a predetermined time. However, for simplicity, this process has not been illustrated in FIG. 13A.

Assuming the profile downloading is successful, then the process proceeds to step 550, where the new profile is compared with a content record 560 maintained on the network device to identify the content retrieved to the device in accordance with a previous profile. However, prior to discussing the rest of FIG. 13A to FIG. 13D, the manner in which the profile is generated by the server 30 will now be described with reference to FIG. 14. The profile generation is preferably performed by software installed on the server 30. The process begins at step 700, and at step 705 the server waits for a device connection. Once the device has connected, it is determined at step 710 whether the device is known, i.e. whether it is represented in the hierarchical structure, and if not, the connection is closed at step 720. The process then returns to step 705 to await a further device connection.

However, assuming that the device is known, then the process proceeds to step 715 where the content identifiers for that device are retrieved from the corresponding element in the hierarchical structure maintained on the database 40. Then, at step 725, it is determined which division the device is contained within in the hierarchical structure, and then the content identifiers associated with that division are also added to the content identifiers retrieved at step 715.

Next, at step 735, it is determined whether the division has a parent within the hierarchical structure, and if so, that parent division is retrieved at step 730, and the content identifiers within that division are then added at step 725 to those content identifiers already retrieved from the database. This process continues until it is determined at step 735 that the current division has no parent (i.e. with reference to the earlier examples, this will mean that the current division is the All division), at which point it is determined that all appropriate content identifiers have been located. Accordingly, these content identifiers are sent to the device at step 740 as the requested profile. The process then returns to step 705 to await a further device connection.

Returning to FIG. 13A, as a result of step 550, any new content to be retrieved, old content to be deleted, or content to be updated, will have been determined through the comparison of the new profile with the previously stored content record 560. Accordingly, the process proceeds to step 570 in FIG. 13B, where it is determined whether there is any content to remove. If so, it is determined at step 575 whether it is appropriate to execute an uninstaller in order to remove the content.

Before continuing with the description of FIG. 13B, the mechanism for determining whether an installer/uninstaller is required will be discussed in more detail. As mentioned earlier, when the content is retrieved to the network device, it preferably also includes related information identifying how that content should be handled upon receipt. In accordance with preferred embodiments of the present invention, the association of this further information with the content is achieved via one or more packagers provided by the system of preferred embodiments, these packagers preferably being embodied as computer programs. This process is illustrated schematically in FIG. 15.

The content delivery mechanism is very flexible, allowing developers to introduce new types of content along with any necessary installers and uninstallers without having to change any client-side software. For example, all of the sales force in a particular organisation could have the latest performance results provided to their devices and automatically installed into a database application on those devices.

Figure 15:
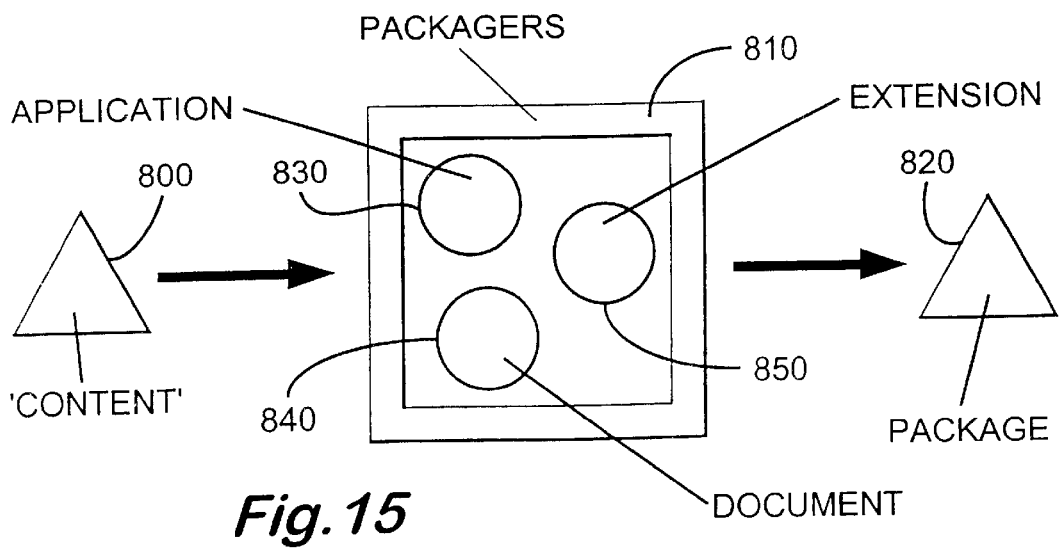
FIG. 15 provides a schematic illustration of how packagers are used in preferred embodiments to package content for distribution.

This flexibility is achieved by bundling content up in standard Java archives (JAR files) which in preferred embodiments have associated therewith a well-known file "META-INF/manifest.mf", and passing those Java archives through a packager as illustrated in FIG. 15. A JAR file is a file or files that have been compressed into a single file using ajar tool supplied with the Java Development Kit.

As illustrated in FIG. 15, the content 800 is passed to an appropriate packager within a group of packagers 810. For example, a particular packager 830 may be provided for packaging applications, a different packager 840 may be provided for packaging documents, and a further packager 850 may be provided for packaging other type of content. The relevant packager alters the content of the manifest file to include at least the name, type and version of the content. The packager is also at liberty to include in this file any other variable which may be required. This results in a package 820 which can be distributed to network devices in accordance with preferred embodiments of the present invention. It should be noted that the resulting package is still completely compatible with Java.

A packager is in preferred embodiments provided for each type of content. In addition, each type of content may optionally have an installer/uninstaller provided to install/uninstall such content on a network device. Since the packagers are type specific, and since any installers/uninstallers are also type specific, it will be apparent that the packager can be arranged to include any variables specifically required by the corresponding installer/uninstaller. For example, if the content type is Microsoft Word documents for PCs, the packager might include within the package the required version number of Microsoft Word that is required to read the file. The installer would then try to locate that version of Word, and, for example, warn the user of the device if it is not found.

As another example, if the content type is an application program, the packager might include within the package an identification of which file is the main executable file, an identification of an icon to be used to represent the program on the desktop, etc. The relevant installer can then use that information to enable it to correctly install the application program.

Hence, it can be seen that depending on the content type, an installer/uninstaller may or may not be needed. The package as retrieved specifies, amongst other things, the content type, as indeed does the content identifier in the profile, and hence the device manager can check to see if an installer/uninstaller is 110 associated with that content type. This may, for example, be appropriate if the content is an application program.

Returning to FIG. 13B, if it is determined at step 575 that an uninstaller should be executed, then the process proceeds to step 585, where the appropriate uninstaller is downloaded and executed in order to remove the relevant content. In preferred embodiments, to download the appropriate uninstaller, the client program asks the RMI registry 310 illustrated in FIG. 3 whether an installer/uninstaller exists for the type of content received. If such an installer/uninstaller exists, it will be downloaded by the RMI registry to the client program, whereafter it can be executed to uninstall the particular content in question.

However, not all content types will require an uninstaller. For example, the content may be a data file which merely needs deleting. In this event, it will determined at step 575 that it is not necessary to execute an uninstaller, in which case the process will proceed to step 580 where the content will be deleted. The process then returns to step 570, to determine whether any further content needs removing. If so, the above described process is repeated.

If not, the process proceeds to step 590, where it is determined whether there is any content to be updated. If so, the process proceeds to step 595, where the updated content is downloaded from the location indicated within the corresponding content identifier provided within the profile. As mentioned earlier, the content is preferably stored on Internet servers, and in this case, the content identifier will identify an appropriate Internet address from which to download the content. Once the content has been downloaded, it will be determined at step 600 in FIG. 13C whether it is necessary to execute an installer and/or uninstaller, as mentioned above this decision being taken based on the type of content to be updated.

If, for example, the content is a data file, then it may not be appropriate to execute an installer and/or uninstaller, and accordingly the process will proceed to step 615, where the outdated content is deleted, and the updated content is saved. However, assuming it is determined that an installer and/or uninstaller are required, then the process proceeds to step 605 where any necessary installer and/or uninstaller is downloaded using the process described earlier with reference to step 585. The uninstaller can then be executed to remove the outdated content, whereafter the process proceeds to step 610, where the necessary installer is executed to install the updated content. The process then returns to step 590 to determine whether any further content needs to be updated. If so, the above described process is repeated, but if not, the process proceeds to step 620 shown in FIG. 13D.

At step 620, it is determined whether there is any new content to be added. If so, then the process proceeds to step 625, where the new content is downloaded using the information provided in the relevant content identifier included within the profile. Then, at step 630 it is decided whether an installer needs to be executed and if so, the process proceeds to step 635, where the appropriate installer is downloaded and executed in order to install the content. If at step 630 it is decided that an installer is not required, then the process can proceed directly to step 640, where the new content is saved. With regard to the issue of where new content should be saved, if an installer is used, it may be arranged to determine if there is a default location for the storage of that type of content. For example, if the content is a Microsoft Word file, then the installer may review the configuration settings of the device to see if a default location for Microsoft Word files is specified, and if so that location will be used for the storage of the content. If no such default location exists, or if an installer is not used, the device manager may be arranged to specify a default location to which to store content.

Once the new content has been stored on the device, the process proceeds back to step 620, where it is determined whether there is any further content to be added. If so, the above described process is repeated, but if no further content is to be added, the process then proceeds to step 645, where the current profile is stored as the content record 560. In preferred embodiments, it is assumed that at this stage the device will contain all content as indicated in the current profile. However, in the event that for some reason the device was unable to retrieve any particular item of content in the profile, for example because the corresponding server was at that time out of action, then it is preferred that the content record 560 be updated to reflect the actual content retrieved to the device in accordance with the profile, rather than merely storing the current profile itself. Once the content record has been updated, then the process proceeds to step 655, where the process terminates.

From the above description, it will be appreciated that the system of preferred embodiments of the present invention provides a platform for managing disparate, heterogeneous, distributed devices. These devices include, but are not limited to, computers, digital mobile telephones and set-top boxes. The system of preferred embodiments provides a unique mechanism for the automatic distribution, installation and removal of almost any kind of content, including applications, without any user intervention. A system administrator uses a management tool to build a program of content for each device or group of devices. At predetermined intervals, a small piece of client-side code compares a profile generated by the server with a record of the content stored on the device in accordance with the previous profile. Any new or updated content is automatically retrieved and installed and any defunct content is removed. In preferred embodiments, the server, management tool, and client program are all Java-based.

To illustrate the versatility of the above system, the following example scenarios can be considered.

Firstly, consider the situation where a member of a corporate network introduces a new device. In accordance with preferred embodiments of the present invention, during synchronisation, the device asks for the identity of the owner. The server establishes the presence of the user in the directory server and automatically installs the device as being owned by that user. The device will be assigned a profile based on its location in the hierarchical structure, and will automatically receive its appropriate content.

As a second example, consider the situation where a member of an organisational unit changes function. In preferred embodiments of the present invention, their user icon within the hierarchical structure is dragged and dropped on to the division representing their new function. The suite of content is then automatically updated to reflect the change the next time the profile is received by the user's device.

As a further example, consider the situation where a team operates a pool of mobile telephones. Normally, an organisational unit in the directory server owns these. When a user requests a device, it is dragged from the organisational unit on to the user's icon. The device will then automatically be provisioned with the content appropriate for that user.

As another example, consider the situation where a new program is to be introduced. A manager packages the new program using one of the packagers described earlier, moves the packaged content to a web server, and tells server 30 the network location of that content. A corresponding content identifier is then generated and associated with the appropriate divisions/devices within the hierarchical structure.

Finally, consider the scenario where a program is updated. Provided it is packaged in the appropriate manner using one of the earlier described packagers, it will be automatically distributed as an upgrade, and the upgrade will be installed in accordance with the process described earlier with reference to FIGS. 13A to 13D.

Although a particular embodiment of the invention has been described herewith, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A system for managing distribution of content to a device, comprising:
    a database for storing a number of elements as a hierarchical structure, content identifiers being able to be associated with elements in the hierarchical structure, and one of the elements representing the device;
    a server for referencing the hierarchical structure in the database to generate a profile for the device, the profile containing a number of content identifiers indicating content to be provided to the device;
    a device manager associated with the device and arranged to receive the profile from the server and to use the content identifiers in the profile to cause the content indicated by the profile to be provided to the device, a record being kept identifying the content provided to the device in accordance with the profile;
    the device manager further being arranged upon receipt of a subsequent profile from the server to compare the content identifiers in the subsequent profile with the record to determine new content not yet provided on the device and old content no longer to be provided on the device, the device manager being arranged to use the relevant content identifiers to cause the new content to be provided to the device, and to cause the old content to be removed.

2. A system as claimed in claim 1, wherein each content identifier provides a name for the corresponding content, and a location indicator identifying a location from which that content can be obtained.

3. A system as claimed in claim 2, wherein the distribution of a plurality of different types of content are managed by the system, and the content identifier further identifies the type of the corresponding content.

4. A system as claimed in claim 2, wherein the content is stored on servers contactable via the Internet, and the location indicator is a URL address.

5. A system as claimed in claim 1, further comprising a number of packagers for associating with a content information required to handle the content when received by the device.

6. A system as claimed in claim 5, wherein the distribution of a plurality of different types of content are managed by the system, and a packager is provided for each type of content.

7. A system as claimed in claim 5, wherein the information associated with a content comprises an identification of an installer to be used to install the content on the device.

8. A system as claimed in claim 1, further comprising a management tool for providing an interface to enable a user to manage the hierarchical structure stored on the database.

9. A system as claimed in claim 8, wherein said elements include one or more divisions, each division representing a logical grouping for devices, the management tool enabling divisions to be created and deleted, and enabling content identifiers to be associated with each division.

10. A system as claimed in claim 9, wherein the profile generated by the server contains any content identifiers associated with the device and any content identifiers associated with a division from which the device depends in the hierarchical structure.

11. A system as claimed in claim 8, wherein the management tool enables person identifiers identifying individuals to be provided as elements in the hierarchical structure, whereby the management tool can be used to associate, within the hierarchical structure, the device with the individual owning that device.

12. A system as claimed in claim 1, wherein the device manager is arranged to make a connection with the server at predetermined intervals in order to request the profile, the device manager identifying the device for which the profile is required.

13. A system as claimed in claim 1, wherein the distribution of a plurality of different types of content are managed by the system, and at least one of said types is computer programs.

14. A system as claimed in claim 1 wherein the database is a relational database.

15. A computer program product for controlling a server to be used in a system as claimed in claim 1, the computer program product being configured in operation to generate a profile for the device with reference to the database, and to transmit the profile to the device manager.

16. A computer program product as claimed in claim 15, wherein the profile is generated in response to a request for the profile from the device manager.

17. A computer program product for controlling a computer to act as a management tool in a system as claimed in claim 1, the computer program product being configured in operation to provide an interface to enable a user to manage the hierarchical structure stored on the database.

18. A computer program product as claimed in claim 17, wherein the elements in the hierarchical structure include one or more divisions, each division representing a logical grouping for devices, the management tool enabling divisions to be created and deleted, and enabling content identifiers to be associated with each division.

19. A computer program product as claimed in claim 17, wherein the management tool enables person identifiers identifying individuals to be provided as elements in the hierarchical structure, whereby the management tool can be used to associate, within the hierarchical structure, the device with the individual owning that device.

20. A computer program product for providing within a device a device manager for use in a system as claimed in claim 1, the computer program product being configured in operation to receive a profile from the server, and to use the content identifiers in the profile to cause the content indicated by the profile to be provided to the device, the computer program product further being configured in operation upon receipt of a subsequent profile from the server to compare the content identifiers in the subsequent profile with a record identifying the content provided to the device in accordance with a previous profile to determine new content not yet provided on the device and old content no longer to be provided on the device, and to use the relevant content identifiers to cause the new content to be provided to the device, and to cause the old content to be removed.

21. A computer program product for controlling a computer to operate as a packager for use in a system as claimed in claim 1, the packager being arranged to associate with a content information required to handle the content when received by the device.

22. A method of managing distribution of content to a device, comprising the steps of:
   storing in a database a number of elements as a hierarchical structure, content identifiers being able to be associated with elements in the hierarchical structure, and one of the elements representing the device;
   referencing the hierarchical structure in the database to generate a profile for the device, the profile containing a number of content identifiers indicating content to be provided to the device;
   with reference to the content identifiers in the profile, causing the content indicated by the profile to be provided to the device;
   maintaining a record identifying the content provided to the device in accordance with the profile;
   upon receipt of a subsequent profile, comparing the content identifiers in the subsequent profile with the record to determine new content not yet provided on the device and old content no longer to be provided on the device, and using the relevant content identifiers to cause the new content to be provided to the device, and to cause the old content to be removed.

23. A system for managing distribution of content to a device, comprising:
   a database for storing a number of elements as a hierarchical structure of devices, content identifiers being able to be associated with elements in the hierarchical structure, and one of the elements representing the device;
   a server for referencing the hierarchical structure in the database to generate a profile for the device, the profile containing a number of content identifiers indicating content to be provided to the device, the profile containing any content identifiers associated with the element representing the device, along with any content identifiers associated with elements in the hierarchical structure from which that element depends;
   a device manager associated with the device and arranged to receive the profile from the server and to use the content identifiers in the profile to cause the content indicated by the profile to be provided to the device, a record being kept identifying the content provided to the device in accordance with the profile;
   the device manager further being arranged upon receipt of a subsequent profile from the server to compare the content identifiers in the subsequent profile with the record to determine new content not yet provided on the device and old content no longer to be provided on the device, the device manager being arranged to use the relevant content identifiers to cause the new content to be provided to the device, and to cause the old content to be removed.

24. A method of managing distribution of content to a device, comprising the steps of:
   storing in a database a number of elements as a hierarchical structure of devices, content identifiers being able to be associated with elements in the hierarchical structure, and one of the elements representing the device;

referencing the hierarchical structure in the database to generate a profile for the device, the profile containing a number of content identifiers indicating content to be provided to the device, the profile containing any content identifiers associated with the element representing the device, along with any content identifiers associated with elements in the hierarchical structure from which that element depends;

with reference to the content identifiers in the profile, causing the content indicated by the profile to be provided to the device;

maintaining a record identifying the content provided to the device in accordance with the profile;

upon receipt of a subsequent profile, comparing the content identifiers in the subsequent profile with the record to determine new content not yet provided on the device and old content no longer to be provided on the device, and using the relevant content identifiers to cause the new content to be provided to the device, and to cause the old content to be removed.

* * * * *